(12) United States Patent
Sellers et al.

(10) Patent No.: US 9,712,409 B2
(45) Date of Patent: *Jul. 18, 2017

(54) AGILE INFORMATION TECHNOLOGY INFRASTRUCTURE MANAGEMENT SYSTEM

(71) Applicant: Cisco Technology, Inc., San Jose, CA (US)

(72) Inventors: Russell E. Sellers, Austin, TX (US); William H. Ballard, San Jose, CA (US); Jeffrey Guillot, Austin, TX (US); Gregory H. Carter, San Jose, CA (US); Nathan W. Atkins, San Jose, CA (US); Nicholas J. Pausback, Austin, TX (US); Matthew R. Engle, San Jose, CA (US); Paul T. Young, San Jose, CA (US); Craig R. Roffers, Austin, TX (US); Adam D. HerrNeckar, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 394 days.

This patent is subject to a terminal disclaimer.

(21) Appl. No.: 14/276,886

(22) Filed: May 13, 2014

(65) Prior Publication Data

US 2014/0250225 A1  Sep. 4, 2014

Related U.S. Application Data

(63) Continuation of application No. 11/229,357, filed on Sep. 15, 2005, now Pat. No. 8,725,853.

(Continued)

(51) Int. Cl.
*G06F 15/16* (2006.01)
*H04L 12/26* (2006.01)

(Continued)

(52) U.S. Cl.
CPC .......... *H04L 43/08* (2013.01); *H04L 12/2602* (2013.01); *H04L 41/022* (2013.01);

(Continued)

(58) Field of Classification Search
CPC ... H04L 29/08072; H04L 29/06; H04L 43/00; H04L 41/22; H04L 12/2602

(Continued)

(56) References Cited

U.S. PATENT DOCUMENTS 6,195,697 B1  2/2001  Bowman-Amuah
6,292,099 B1  9/2001  Tse et al.

(Continued)

FOREIGN PATENT DOCUMENTS

WO   WO 03/036914 A1   5/2003

OTHER PUBLICATIONS

No Author Name Supplied in Source Data: "Distributed Aggregated Multi-protocol Poller Using a Common Event Transport", IP.COM Journal, IP.COM Inc., Dated Aug. 3, 2004, 2 pages.

(Continued)

*Primary Examiner* — Philip Chea
*Assistant Examiner* — Van Kim T Nguyen
(74) *Attorney, Agent, or Firm* — Hickman Palermo Becker Bingham LLP; Malgorzata A. Kulczycka

(57) ABSTRACT

The agile information technology infrastructure management system and related methods and processes provide a solution with the required flexibility to effectively and efficiently monitor and manage a wide-variety of disparate information technology and network infrastructure deployed in businesses and enterprises throughout a region or the world.

17 Claims, 12 Drawing Sheets

Related U.S. Application Data

(60) Provisional application No. 60/611,087, filed on Sep. 15, 2004.

(51) Int. Cl.
*H04L 12/24* (2006.01)
*H04L 29/14* (2006.01)

(52) U.S. Cl.
CPC ...... *H04L 41/0213* (2013.01); *H04L 41/0604* (2013.01); *H04L 41/069* (2013.01); *H04L 41/0631* (2013.01); *H04L 41/0816* (2013.01); *H04L 41/5074* (2013.01); *H04L 43/00* (2013.01); *H04L 43/06* (2013.01); *H04L 41/22* (2013.01); *H04L 43/045* (2013.01); *H04L 43/0811* (2013.01); *H04L 43/0817* (2013.01); *H04L 43/10* (2013.01); *H04L 43/106* (2013.01); *H04L 43/16* (2013.01); *H04L 69/40* (2013.01)

(58) Field of Classification Search
USPC .......................................................... 709/224
See application file for complete search history.

(56) References Cited

U.S. PATENT DOCUMENTS

| | | |
|---|---|---|
| 6,691,244 B1 | 2/2004 | Kampe |
| 7,007,104 B1* | 2/2006 | Lewis ................... H04L 41/042 709/206 |
| 7,047,298 B2 | 5/2006 | Davies |
| 7,231,550 B1 | 6/2007 | McGuire et al. |
| 7,293,287 B2 | 11/2007 | Fischman et al. |
| 7,546,300 B2* | 6/2009 | Chisholm ........... G06F 21/6218 |
| 7,555,545 B2* | 6/2009 | McCasland ............ H04L 41/12 370/254 |
| 7,600,007 B1* | 10/2009 | Lewis .................... G06Q 10/04 709/223 |
| 7,617,073 B2 | 11/2009 | Trinon et al. |
| 8,725,853 B2* | 5/2014 | Sellers ................ H04L 12/2602 709/223 |
| 2003/0147381 A1 | 8/2003 | Nelson et al. |
| 2003/0204547 A1* | 10/2003 | Davis ..................... G06F 9/4881 718/101 |
| 2005/0182882 A1 | 8/2005 | Chu |
| 2005/0257268 A1 | 11/2005 | Guo et al. |
| 2006/0087409 A1* | 4/2006 | Korzeniowski ..... H04L 41/0604 340/286.02 |

OTHER PUBLICATIONS

International Searching Authority, "Search Report and the Written Opinion", in application No. PCT/US05/33349, dated Mar. 2, 2007 6 pgs.

European Patent Office, "Search Report" in application No. 05812139.3-1244, dated Dec. 19, 2012, 15 pages.

Current Claims in application No. PCT/US05/33349, dated Mar. 2007, 3 pages.

Current Claims in application No. 05812139.3-1244, dated Dec. 2012, 4 pages.

\* cited by examiner

AGILE INFORMATION TECHNOLOGY INFRASTRUCTURE MANAGEMENT SYSTEM

BENEFIT CLAIM

This application claims the benefit under 35 U.S.C. §120 as a continuation of application Ser. No. 11/229,357, filed Sep. 15, 2005, which claims the benefit of provisional application 60/611,087, filed Sep. 15, 2004, the entire contents of which are hereby incorporated by reference as if fully set forth herein.

FIELD OF THE INVENTION

This invention relates in general to the field of information technology, and more particularly, to network management systems.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network management systems are used to remotely monitor computer networks. Network management may be defined as the capability to control and monitor a computer network from a central location. The International Organization for Standardization (ISO) has defined a conceptual model for describing the key functional areas of network management which include the following:

Fault Management: Provides facilities that allow network managers to discover faults in managed devices, the network, and network operation, to determine their cause and to take remedial action. To enable this, fault management provides mechanisms to: Report the occurrence of faults, log reports, perform diagnostic tests, and correct faults (possibly automatically).

Configuration Management: Monitors network configuration information so that the effects of specific hardware and software can be managed and tracked. Configuration management may provide the ability to initialize, reconfigure, operate and shut down managed devices.

Accounting: Measures network utilization of individual users or groups to: Provide billing information, regulate users or groups, and help keep network performance at an acceptable level.

Performance Management: Measures various aspects of network performance including the gathering and analysis of statistical data about the system so that it may be maintained at an acceptable level. Performance management provides the ability to: obtain the utilization and error rates of network devices, provide a consistent level of performance by ensuring that devices have a sufficient capacity.

Security Management: Controls access to network resources so that information cannot be obtained without authorization by: Limiting access to network resources, providing notification of security breaches and attempts.

Currently available network management systems suffer from numerous disadvantages and problems. Typically these systems are designed to work with only one protocol or one hardware platform and include software that is hard coded, making them inflexible, of limited scalability and use, especially with the numerous different enterprise critical systems used in modern businesses and enterprises. Solutions and systems do not exist to effectively and efficiently manage the disparate information technology infrastructure and systems in common use today. For example, finding a network management system to cost effectively manage disparate enterprise systems that include numerous types of communications protocols, software applications, telecommunication systems, servers, routers and other critical systems is impossible with available solutions and service providers.

The emergence and implementation of sophisticated information technology infrastructure elements not directly involved in packet routing and switching has dramatically increased the requirements of what is required to remotely monitor and manage such infrastructure. Traditional network management systems do not have the capability or flexibility to survive in this environment. The need to monitor and manage not only network metrics and performance but enterprise and mission-critical applications, including the capability to monitor any layer of the Open Systems Interconnection (OSI) network model, implemented on disparate systems and platforms, further complicate the capability of existing network management systems to be modified to perform such functions.

Current systems do not have the capability or flexibility to effectively monitor and manage a complex IT infrastructure. Further, the wide variety of available and deployed network and application protocols prevent existing network management systems from monitoring and managing IT infrastructure utilizing a number of different management protocols.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
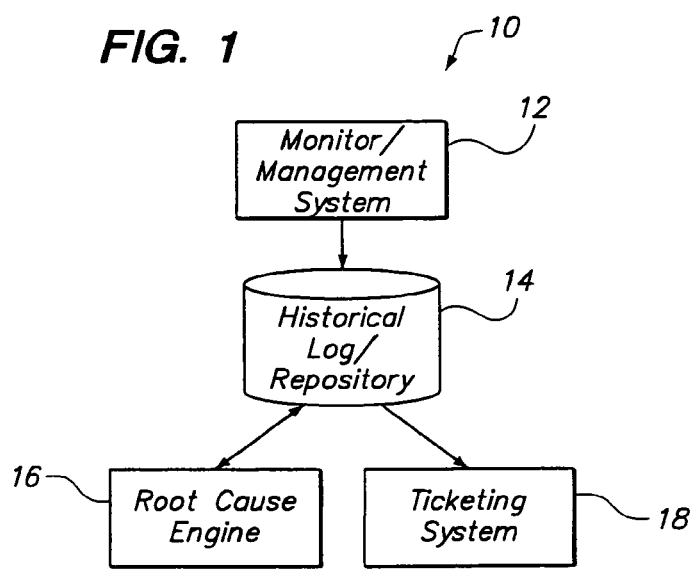
FIG. 1 is an overview block diagram that illustrates an agile information technology infrastructure management system according to an embodiment.

A method and apparatus providing an agile information technology infrastructure management system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural & Functional Overview
3.0 Example Embodiments of Agile Information Monitoring System
   3.1 Monitoring Architecture
   3.2 Data Provider/Management Channel Architecture
      3.2.1 Log Collection Management Channel
      3.2.2 Formula Channel
   3.3 Profile Plan Manager
   3.4 Schedule Tweaks
   3.5 Reporting and Graphical Analysis
4.0 Hardware Overview
5.0 Extensions and Alternatives 1.0 General Overview From the foregoing it may be appreciated that a need has arisen for an agile information technology infrastructure management system that overcomes one or more of the disadvantages and problems of prior systems and methods. The agile information technology infrastructure management system provides the capability to monitor and manage not just network devices, but also the capability to monitor and manage a myriad of other devices, processes, applications, agents, software, systems and the like (each of which may be referred to generically as "elements" or "managed elements").

The following numbered sentences provide a summary overview of various aspects of certain embodiments. These numbered sentences are intended only to describe and provide insight into various aspects and combinations and should not be construed or used for any other purpose.

1. An information technology infrastructure monitoring architecture of an agile information technology infrastructure management system for use in monitoring and managing elements of a disparate information technology infrastructure, the system comprising: a scheduler operable to receive and process a plurality of management descriptors to generate commands associated with the polling of the elements of the information technology infrastructure, wherein the management descriptors include profiles that define information needed for monitoring the elements of the information technology infrastructure; a plurality of data providers that include at least a first data provider that defines a first protocol for use in communicating management information with a first type of element, a second data provider that defines a second protocol for use in communicating management information with a second type of element, and a poller operable to communicate with the elements of the information technology infrastructure, wherein the plurality of data providers is operable to receive a query, to poll an element of the information technology infrastructure using one of the plurality of data providers in response to the query, and to receive a result of the query from the element; and a protocol independent command processor operable to receive a command associated with the polling of the element of the information technology infrastructure from the scheduler, to generate a query in response, to communicate the query to the plurality of data providers, to receive the result of the query from the element from the plurality of data providers, and to take an action based upon the command and the result of the query.

The architecture or system may also include a repository or database to store some or all of the following information: a Common Interface Model data model of the network elements of the IT infrastructure being monitored and managed, management descriptors, profiles and attributes of the managed elements, and event information. Further, a root cause analysis engine may be provided to determine the likely cause of an event based on available algorithms and using the CIM data model of the IT infrastructure. This allows certain events to be ignored or placed at a lower priority when it can be determined or correlated that various events were actually caused by another event. This provides for faster response and better IT infrastructure management and monitoring to ensure that available IT resources are optimally utilized.

The architecture or system may also allow for unscheduled or unsolicited events to be received, logged and acted upon, if necessary, as defined by the management descriptors. These management descriptors or commands may be provided, in one embodiment, to an unsolicited command processor. Unsolicited messages may include, for example, traps, syslog, etc.

The architecture or system may also include a ticketing system to allow network or IT infrastructure operators to monitor and manage activity more effectively and efficiently. The architecture or system may also include a reporting system, such as the CIO Dashboard described in Section 3.5.

2. A method for using an agile information technology infrastructure management system, the method comprising: performing an auto-discovery of elements of an IT infrastructure to be monitored to generate element data models; determining if profiles exist for all of the elements of the IT infrastructure; performing a profile plan manager to generate management descriptors by combining the profiles and the element data models; adjusting the profiles of the management descriptors; and monitoring the elements of an IT infrastructure.

The profiles may include one or more attributes, which may consist of questions to poll, interrogate or ask an element being monitored, and may also include other profiles. The profiles may also include actions to take if certain conditions occur at the elements as reported back after being polled or queried. The term data provider may be used synonymously with the term management channel.

The various embodiments and implementations described herein may provide a profusion of technical benefits, some of which are outlined below. A technical benefit may include the capability to effectively and efficiently provide IT infrastructure management services to disparate IT infrastructure and including virtually any network or IT element. In one implementation, the system is protocol independent that results in a highly scalable system that can be quickly and efficiently implemented to monitor virtually any available IT infrastructure.

Another technical benefit may include the capability to provide management or client graphical interfaces that provide a "quick look" at the health of IT infrastructure being monitored and managed. Disparate IT infrastructure may be conveniently and effectively monitored.

Yet another potential benefit may include, in certain embodiments, the capability to provide network or IT management personnel with reports and interfaces that allow for quick "drill down" to underlying information to efficiently and quickly identify problems so that any problems with IT infrastructure can be corrected and properly managed.

Still yet another potential feature may include, in certain embodiments, the capability to monitor and manage not only network elements, but software applications and enterprise systems and applications that exist at any layer of the Open Systems Interconnection (OSI) reference model. The capability to monitor hardware and related software systems from different vendors provides a substantial technical benefit.

Another potential feature may include, in certain embodiments, the capability to monitor and manage servers, such as telephony servers that provide IP Telephony servers, such as VoIP telephony services, while also monitoring traditional network elements, such as a router using SNMP as its management channel.

In certain embodiments, benefits may include the following: One click Web views of IT infrastructure with drill-down screens; Rapid roll-out and scalability of new technologies; Turnkey integration with existing systems and tools; 24/7 remote management and access to technological expertise; Meets all levels of infrastructure IT security needs; Significantly reduced infrastructure and maintenance costs. Other technical benefits are readily apparent to one skilled in the art from the following figures, description, and claims.

In other aspects, the invention encompasses a computer apparatus and a computer-readable medium configured to carry out the foregoing steps.

2.0 Structural and Functional Overview

Although an example embodiments of the present invention are illustrated below and herein, the present invention may be implemented using any number of techniques, materials, designs, systems and configurations whether currently known or in existence. The present invention should in no way be limited to the exemplary implementations, drawings, and techniques illustrated below, including the exemplary designs and implementations illustrated and described herein. Embodiments may be implemented using any number of mechanisms, arrangements, structures, and/or techniques. Thus, embodiments are in no way limited to the example implementations, drawings, and techniques illustrated and described herein.

This provisional application incorporates by reference for all purposes, co-pending U.S. patent application Ser. No. 10/397,552, entitled Alarm Server Systems, Apparatus, and Processes, naming Stephen W. Davies as inventor, filed Mar. 25, 2003, which pursuant to 35 U.S.C. §120 claims the benefit of U.S. patent application Ser. No. 09/896,988 (now U.S. Pat. No. 6,539,428, issued Mar. 25, 2003), entitled Alarm Server Systems, Apparatus, and Processes, naming Stephen W. Davies as inventor, which pursuant to 35 U.S.C. §120 claims the benefit of U.S. patent application Ser. No. 09/032,408 (now U.S. Pat. No. 6,058,420, issued May 2, 2000), entitled Alarm Server Systems, Apparatus, and Processes, naming Stephen W. Davies as inventor, filed Feb. 27, 1998.

FIG. 1 is an overview block diagram that illustrates an agile information technology infrastructure management system 10 according to one embodiment. Embodiments do not require all of the elements or blocks shown in FIG. 1 to be used. The agile information technology infrastructure management system 10 includes a monitoring/management system 12, which may include an architecture described more fully below in connection with other drawing figures, a historical/log repository 14, a root cause engine 16 (which also may be referred to as an event correlation engine or event correlator), and a ticketing system 18. The historical/log repository 14 may be an integrated database or include distributed databases and may be implemented using any known or available database technology. In one implementation, the IT infrastructure is modeled using a known standard, such as the Common Information Model (CIM) schema or standard developed by the Distributed Management Task Force (DMTF).

As the monitoring/management system 12 detects events and/or alarms, this information may be logged or stored in the historical/log repository 14. The root cause engine 16 or event correlation engine has the capability, in one implementation, to access the IT infrastructure topology information in the historical/log repository 14, and to access events logged or stored in the repository to perform root cause or event correlation analysis. Software applications are commercially available to perform root cause analysis, as would be known or available to one of ordinary skill in the art. For example, if several traps, alarms or events are generated from various routers failing because a router upstream of all of these failed routers has failed, the root cause engine 16 may detect or correlate these events to learn that the vast majority of the network or IT infrastructure failure events were caused by the failure of the upstream router.

A ticketing system 18 may be used to generate tickets to be acted upon by IT or network infrastructure operators to perform operations to improve IT infrastructure performance or to reinitiate IT infrastructure processes or applications.

Although not expressly shown in FIG. 1, various reporting and graphical analysis tools may be utilized in implementations to assist with assessing network status and health. For example, Section 3.5 describes a "Chief Information Officer (CIO) Dashboard" that may be used by a client or end-user to quickly and efficiently visualize the health of their IT infrastructure.

Figure 4:
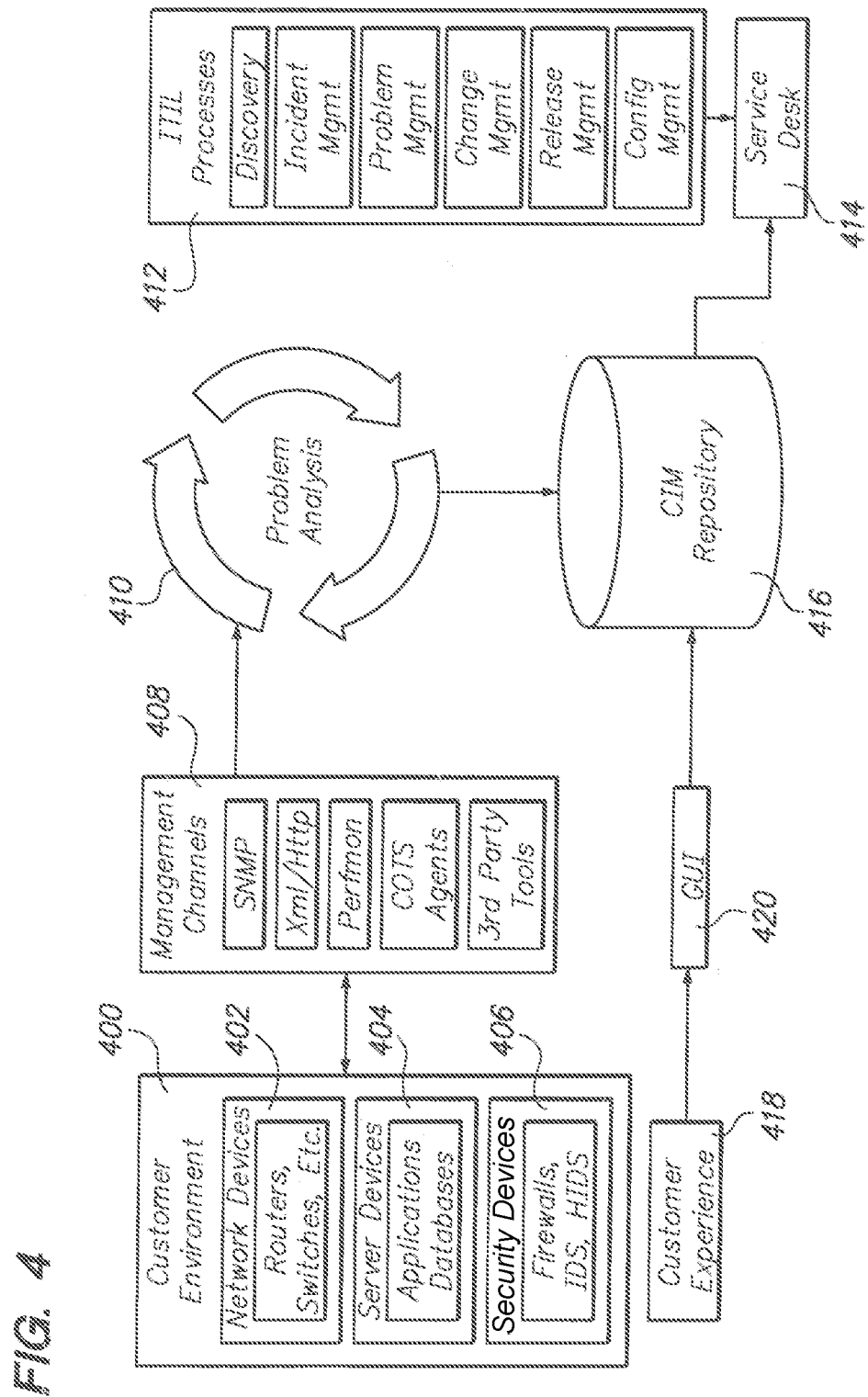
FIG. 4 is another block diagram view of the architecture for use in monitoring and managing an IT infrastructure using the agile information technology management system according to another implementation.

FIG. 4 is another block diagram view of the architecture for use in monitoring/managing an IT infrastructure using the agile information technology infrastructure management system according to an embodiment. In the software architecture of FIG. 4, customer environment 400 is associated with a customer of a network service provider, and includes one or more network devices 402, such as routers and switches, one or more server devices 404 that host applications, databases, or other server resources, and one or more security devices 406, such as firewalls, intrusion detection systems, etc. Elements of customer environment 400 cooperate to deliver one or more services that contribute to customer experience 418.

Customer environment 400 is coupled through one or more management channels 408 to a problem analysis system 410. Management channels 408 may include SNMP, XML, HTTP, a performance monitor protocol, COTS agents, etc. Problem analysis system 410 stores and retrieves data to and from a common interface model (CIM) repository 416.

A graphical user interface 420 delivers a view of the health and status of all elements of customer environment 400, based on data in repository 416. In one embodiment, GUI 420 comprises a graphical dashboard that may be used to view the health of the IT infrastructure being managed. Section 3.5 provides an example of a CIO Dashboard that could be used for this purpose.

One or more other applications deliver a plurality of management services 412, such as device discovery, incident management, problem management, change management, release management, and configuration management, with respect to elements of customer environment 400. A service desk application 414 is coupled to management services 412 for selecting and implementing the management services. The service desk application 414 also relies on repository 416 to provide data values obtained from customer environment 400. Service desk application 414 may comprise a ticketing system used to interface with the repository and to report ticket information and events.

Figure 5:
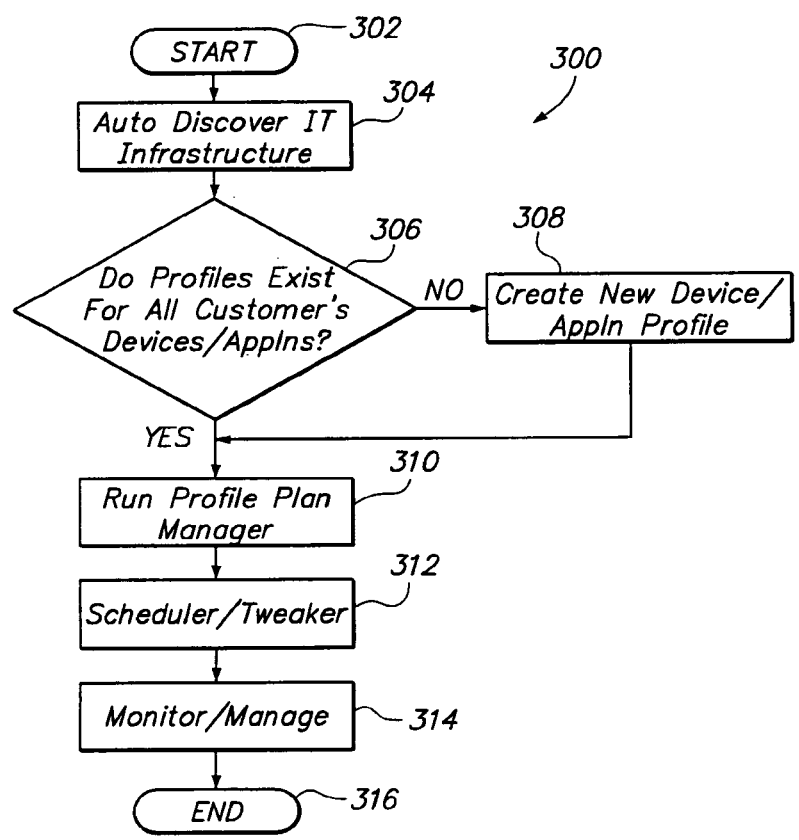
FIG. 5 is a flow chart of a method or process of using an agile information technology infrastructure management system, according to an embodiment.

FIG. 5 is a flow chart of a method or process 300 of using an agile information technology infrastructure management system according to an embodiment. The method 300 begins at step 302 and proceeds to step 304 where a client or customer's information technology infrastructure is discovered. For example, commercially available software may be used with a client's IT infrastructure to identify discrete IT infrastructure elements that make up the client's overall IT infrastructure. In one embodiment, this IT infrastructure information may be stored in a database or repository using the Common Information Model (CIM) schema or standard developed by the Distributed Management Task Force (DMTF). It should be understood, that step 304 may involve virtually any known or available software or systems that identify and store information detailing a client's IT infrastructure. The IT infrastructure, for example, may include servers, networks, such as LANs, WANs, software applications, routers, and virtually any known or available IT infrastructure element that may be monitored and/or controlled or managed through a communications link, such as a management channel, to provide such functionality.

The method 300 proceeds next to decision block 306 where the client's IT infrastructure is analyzed to determine if a monitoring/management profile exists for all of the client's IT infrastructure elements. The IT infrastructure elements may also be referred to as devices, applications or managed elements. If a profile exists, the method 300 proceeds to step 310, otherwise it proceeds to step 308 where an IT infrastructure element profile is created for the element, which could be a device or software application that does not currently have a profile.

An IT infrastructure element profile for use in an agile information technology infrastructure management system may include a variety of attributes or questions related to the element and may include other profiles, which are also made up of one or more attributes or questions. For example, the IT infrastructure element may be a router made by a particular manufacturer. The profile for this element, which is a router, may include a variety of attributes or questions, such as the relevant management channel or data provider that is used to communicate management information to and from the element, such as the SNMP protocol for routers. Other attributes may include, for example, how often the managed element should be polled, what action should be taken if a threshold is met or violated, etc. Virtually any available management information or question may be included as an attribute in the profile for a managed IT infrastructure element. Similarly, a desired action to take in response to receiving a result back from the polling or interrogation of the managed element that was included as an attribute in the profile for a managed element may include virtually any available or desired action to take.

A profile may include, in one embodiment, an identifier of the attribute or variable we want to monitor, what management channel to use to get the variable, a threshold to compare the variable to, and an action to take if a threshold is violated.

Because of the wide variety of known and available IT infrastructure elements, each with their own unique capabilities and methodologies to provide relevant monitoring and managing information, the capability to predefine profiles, which include underlying attributes, questions or actions, for commonly known and available IT infrastructure elements can provide substantial benefits and savings in getting IT infrastructure setup to be monitored and managed. For example, a server profile may include various attributes such as how often memory should be polled, how often the disk should be polled, and how often the CPU status should be requested. This may involve multiple management channels or data providers. For example, Perfmon is a protocol that is a management channel or data provider. This management channel may be used to monitor and manage certain aspects of a server and this would be provided as part of the profile for the server, which is the manage element in this example. Other aspects of the server profile may include other management channels or data providers that are used to monitor and manage software applications, this may include an Oracle data provider, an agent data provider, an SQL server data provider, a TCP data provider, a WMI data provider, an HTTP data provider, or an ICMP data provider. As is illustrated, a profile for an IT infrastructure element that may include various attributes or questions and may utilize multiple management channels or data providers. Once these are predefined as "template" profiles that may be associated with a new client's IT infrastructure element, the monitoring and management service provided by embodiments will be consistent from client to client and can be set up in hours as opposed to the weeks or months that are required from other management systems.

The method 300 proceeds next to block 310 where a profile plan manager may be run. A profile plan manager is preferably provided as a software tool to link or associate a standard or predefined profile with a corresponding managed element. In a preferred embodiment, this results in the generation of a run-time file called a descriptor or management descriptor. The descriptors may be thought of as the combination of the profiles with the associated management elements of the client's IT infrastructure. One embodiment of a system that may serve as a profile plan manager is described in Section 3.3. The profile plan manager (or other processes of method 300), in one embodiment, provides predefined limits on profile fields or variables that cannot be exceeded or changed. For example, the time for polling or interrogating memory may have to occur or be set at a value between to boundary values to ensure it falls within a desired range.

The method 300 may proceed next to block 312 where a scheduler-tweaker may be run to change a management descriptor because of a specialized or desired change in how a particular IT infrastructure element should be monitored and/or managed. In other embodiments, the profile may be "tweaked" as desired to allow for a desired change before block 310. Section 3.4 includes a description of one embodiment of "tweaks" that could be implemented in an embodiment.

The method 300 proceeds next to block 314 where the agile information technology infrastructure management system may be used to monitor and manage a variety of IT technology, including disparate IT infrastructure located in various remote locations. This process is described more fully herein. The method 300 ends at 316.

Figure 2:
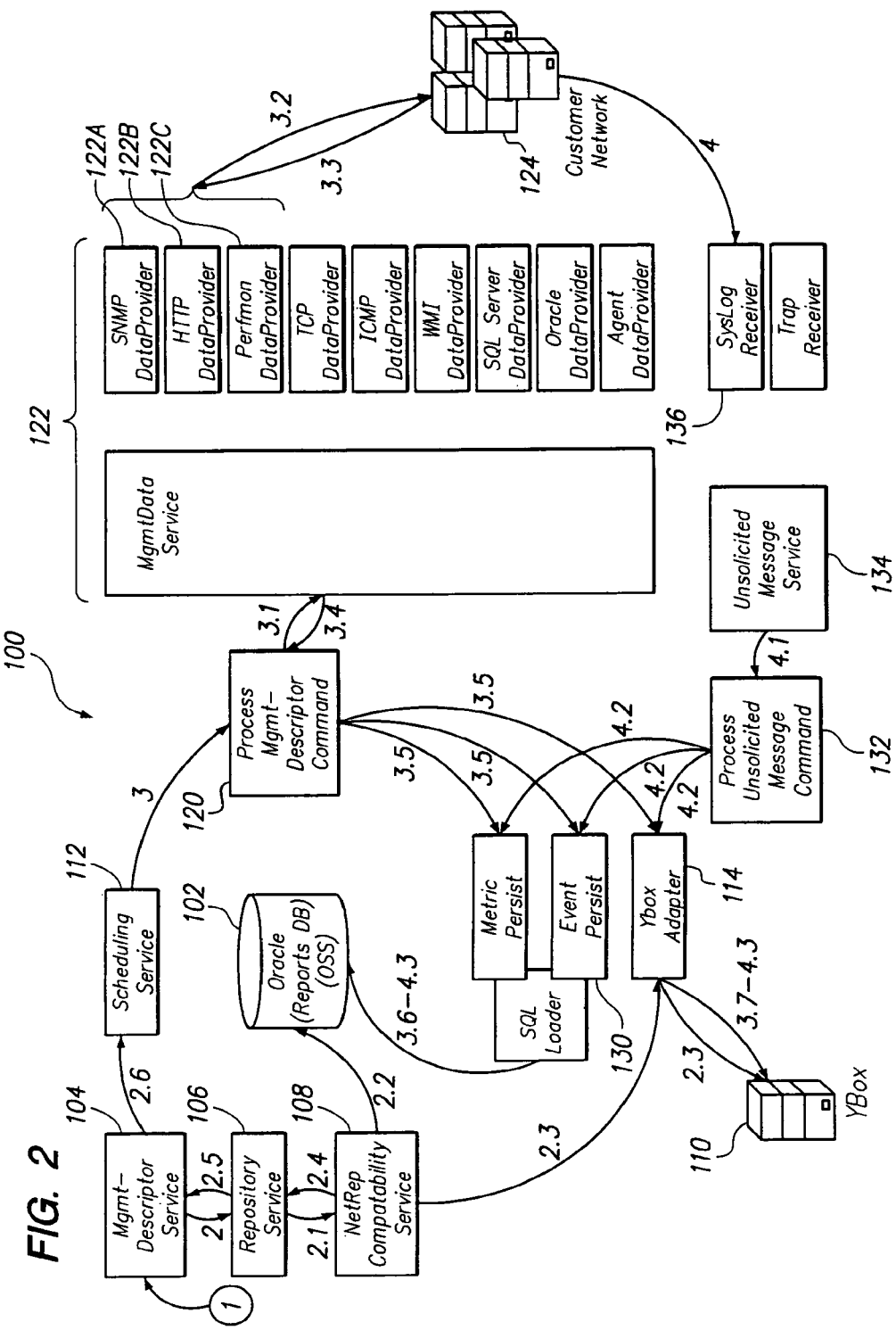
FIG. 2 is a block diagram of an architecture for use in monitoring/managing an IT infrastructure using the agile information technology infrastructure management system.

3.0 Example Embodiment of Agile Information Management System 3.1 Monitoring Architecture FIG. 2 is a block diagram of an architecture 100 for use in monitoring/managing an IT infrastructure using the agile information technology infrastructure management system according to an implementation. The term "monitoring" as used herein should also be understood include the term "monitoring and/or management."

The architecture 100 may include the monitoring/management system 12 and the historical/log repository 14 of the implementation of FIG. 1, and, in certain embodiments, as also including the root cause engine 16 and the ticketing system 18. FIG. 1 includes various numerals and associated lines and arrows with corresponding numerals and descriptions provided herein to describe the processes being performed.

Information about the IT infrastructure and its topology may be stored in a repository 102 in any format, such as in the Common Information Model (CIM) format, and may be accessible to various elements in the architecture 100 as desired. The repository 102 may also include management descriptors, which are run-time code, that contain profiles of associated IT infrastructure elements that are to be monitored and/or managed by the architecture 100. This is described below in more detail in connection with FIG. 5.

The management descriptors are provided for the IT infrastructure to be monitored (and/or managed). At block 104, the management descriptors are received and loaded into a scheduler 112 to be scheduled to be run for the IT infrastructure being monitored. This may be achieved through suitable software routines, such as those shown and described in blocks 106 and 108. A root cause analysis engine 110, similar to the root cause engine 16 of FIG. 1, also receives or accesses IT infrastructure topology information through the repository 102, and possibly using a root cause analysis engine adapter 114.

The scheduler 112 receives the management descriptors and establishes schedules to run the management descriptors, which are associated with a managed element (which will be polled or interrogated), such as through a CIM object and a profile. The scheduler 112 generates a command for a management descriptor and provides this to a protocol independent command processor 120 to define when the managed element will be polled. Section 3.2.2 ("Formula Channel") provides a description of one embodiment of an implementation of how solicited messages may be handled by an embodiment.

The protocol independent command processor 120 receives the commands and generates a query to poll the network element. This query is provided to a plurality of data providers 122, each of which includes a poller, to communicate with a managed element 124. Thus, the plurality of data providers provides a multi-protocol poller. The data providers communicate using any of a plurality of management channel protocols. For example, data providers may be configured to interoperate with SNMP, XML, HTTP, Perfmon (Performance Monitor), TCP, ICMP, WMI, SQL Server, ORACLE database manager, etc.

When the plurality of data providers 122 receives a response to the query from the managed element, the response is provided back to the protocol independent command processor 120 where an action may be taken if needed, and as defined in the profile, and hence the management descriptor. This may include generating an event and persisting or storing the event in the repository 102 using interfaces 130.

The root cause analysis engine 110 may be provided to determine the likely cause of an event by analyzing the events stored in the repository 102, and the CIM or model of the IT infrastructure. These techniques are available and are known by one of ordinary skill in the art. When a root cause is determined, the root cause analysis engine 110 may generate an event that is stored or persisted in the repository 102.

The architecture 100 may also include a ticketing system, not shown in FIG. 2, that will preferably be provided, as well as a reporting system or client interface to view reports and monitor IT infrastructure information.

An unsolicited command processor 132 may be provided to receive management descriptors or commands related to unsolicited protocols, such as SNMP traps. In one embodiment, a syslog receiver 136 or a trap receiver 137 receives one or more unsolicited syslog messages or traps from one or more elements in customer network 124. The syslog receiver 136 or trap receiver 137 format the received messages or traps according to a canonical format and then pass the canonical unsolicited messages to an unsolicited message service 134, which may queue the unsolicited messages or apply additional formatting or corroboration prior to passing the unsolicited messages to unsolicited command processor 132. When these unsolicited messages are received, they may be reported as events and stored in the repository 102. Section 3.2.1 ("Log Collection Management Channel") provides a description of one embodiment of an implementation of how unsolicited messages may be handled by an embodiment.

Protocol-independent command processor 120 and unsolicited command processor 132 are coupled to repository 102 through metric persistence interface 133 and event persistence interface 130, which format received polling information and unsolicited commands into database update commands. In one embodiment, database update commands are formatted using Structured Query Language (SQL), and repository 102 is an SQL database. The metric persistence interface 133 and event persistence interface 130 provide SQL statements sufficient to update the repository 102 with polled values or events to SQL loader 135, which buffers the SQL statements and performs updating of repository 102.

The metric persistence interface 133 and event persistence interface 130 also are coupled to root cause analysis engine interface 114. Therefore, root cause analysis engine 110 may receive a copy of events or messages that the metric persistence interface 133 and event persistence interface 130 generate, and can use such messages in analyzing root causes of network problems.

In another embodiment, operation of monitoring architecture 100 may proceed as follows. The monitoring server starts. Configuration commands determine which management domain the server will process requests for. At arrow 2 of FIG. 2, the management descriptor service loads management descriptors for managed elements from the repository. At arrow 2.1, the repository service forwards requests to a NetRep compatibility service. At arrow 2.2, one or more layer 2 polling definitions are extracted from NetRep. At arrow 2.3, managed elements are created in the CIM of the root cause analysis system 110. At step 2.4, NetRep data is transformed into CIM-compliant objects. For example, a template is transformed into a managed element, query, threshold, and related objects. At step 2.5, CIM objects are aggregated into management descriptors. At step 2.6, management descriptors are scheduled to run with a scheduling service.

At arrow 3, the scheduling service 112 executes a process management descriptor command. At arrow 3.1, the query is executed against the management data service. At arrow 3.2, a data provider issues a request to a managed element. At arrow 3.3, the managed element responds to the request. At arrow 3.4, results from the query are interpreted. For example, alarm or data persist events are created. At arrow 3.5, interpretation events are processed. At arrow 3.6, metric and event data are persisted into the database. At arrow 3.7, events are forwarded to the root cause analysis system 110.

At arrow 4, the unsolicited message service 134 receives a message from a managed element in customer network 124. At arrow 4.1, the message is parsed, identified and interpreted, e.g., using regular expression matching. At arrow 4.2, interpretation events are processed. At arrow 4.3, metric and event data are persisted into the database. At arrow 4.4, events are forwarded to the root cause analysis system 110.

The monitoring/management system 12 may be implemented, in one embodiment, using a monitoring server as now described. The monitoring server comprises one or more software elements hosted by one or more processors that cooperate to perform the functions as now described. The monitoring server is responsible for collecting information from network devices based on profiles. Monitoring consists of a shared kernel of libraries providing a base API, various programs to run monitors including a long running Windows server, and a command line utility. Monitoring covers both polling, or repeating a monitor query on an interval as well as data collection. Multiple protocols are supported, and can be mixed, allowing multi-protocol queries to be sent to a device in an integrated schedule known as a profile. This flexibility allows users to tailor monitoring to meet custom needs on the fly.

In one embodiment, the monitoring system 12 comprises a programmable server that defines a language for configuring monitoring. The user may program and configure the monitoring server to collect a wide range of data on multiple network protocols, process the data, and forward the data to additional systems via actions. The monitoring system is a runtime engine for executing a Monitoring Language. Each aspect of the monitoring language is enforced by a Monitoring Language Schema, expressed as XML Schema.

Several major components contribute to the programmability of the monitoring server monitoring language. Each component is expressed in XML, allowing easy editing with any text editor as well as access with custom GUI tools. The language components are used together to reprogram the monitoring server. In one embodiment, the components comprise a monitoring profile, management attribute, and descriptor, each of which is now described.

A managed system represents the information needed to access a device on the network such as a router, switch, server, or management agent. This includes information needed to locate the device, such as DNS name or IP address, SNMP community string, username, and password. This data is combined with a set of named Profiles, or sets of monitors to run against a device. A managed system may be implemented in an XML file. The managed system references profiles by URL, allowing the profiles to be stored on multiple different types of servers.

A monitoring profile is a collection of reusable management attributes that defines a set of questions to ask a device. A monitoring profile does not contain device-specific information such as connection strings or IP addresses. This parameterization allows a profile to be defined once and used by multiple devices simultaneously. This approach has the added benefit of allowing a central modification to the profile to upgrade the monitoring of a wide array of devices.

Monitoring profiles can be combined by inclusion, or referencing one monitoring profile from another profile. This approach allows profiles to be constructed as components and reused. For example, most devices will use an ICMP ping or SNMP ping. Such a ping operation can be defined one time and then included into other device specific profiles, such as a profile dedicated to processing Cisco 2621 routers or a profile dedicated to monitoring Dell 2650 servers.

A profile includes one or more management attributes and one or more included profiles. Within a profile, management attributes and other profiles are referenced by URL, allowing profiles to be built from component parts to suit monitoring needs.

A management attribute is a specific question to ask a device. The question consists of the sample size, schedule, timing, and queries to extract information from a device. Management attributes are parameterized, reusable components that are combined to form profiles. Examples of management attributes include protocol queries, algorithms, and actions.

For protocol queries, each management protocol is wrapped with a data provider that provides an SQL-compatible syntax for extracting network management information from devices. Each protocol data provider has a logical schema that exists for each device that allows a user to define SELECT queries to extract data through a network protocol.

Algorithms provide an ability to filter and direct alarm flow to actions. Algorithms can establish thresholds for sending monitoring data along to other systems via actions. Algorithms control the value of the AlarmState generated by a monitoring cycle descriptor execution. If the algorithms fire successfully, the AlarmState is Alarm. If algorithms do not fire successfully, the AlarmState is Clear. Other potential states include Exception, which occurs when an unknown failure occurs in executing a descriptor, and Timeout, if executing a descriptor resulted in exceeding the specified timeout threshold.

Algorithms are thus a first pass indicator of a potential alarm and can instruct event correlation systems that a potential alarm exists. Such systems are responsible for actually declaring an alarm.

Actions provide the ability for a management attribute to respond to collected data. Actions can record data, create tickets, or post events to allow other programs to take additional actions. The fundamental action is to relay AlarmState data, including the descriptor output to downstream event correlation systems. This data is used to determine the presence and scope of an alarm condition. The second standard action is recording performance information to a relational database for later reporting. Additional actions are possible that allow the monitoring server to execute independently of event correlation, such as directly sending an email or writing to a storage database.

A management descriptor is a specific instantiation of a management attribute for a device complete with connection information. A management descriptor serves as a base-level program instruction to the monitoring kernel in order to collect data from a device. A user does not author a management descriptor directly; instead, a management descriptor is generated internally by the monitoring server by the device descriptor compiler. Descriptors are dumped to disk by the monitoring runtime to assist in debugging. This approach allows a user to determine what the monitoring server is doing at runtime for specified Managed Systems.

The monitoring runtime is a compiler that receives Managed Systems and Profiles as input and generates Management Descriptors that are scheduled to run and collect data on configured intervals. The runtime deals with protocol selection, scheduling, throttling, authentication, query parsing, and forwarding monitoring data to further systems, including databases for reporting and runtime system for analysis and alarming. The monitoring runtime is packaged as a library assembly that can be invoked from an API call, command line, or Windows Service application.

The monitoring runtime comprises the Managed System Profile Compiler and the Monitoring Server. The compiler is responsible for translating Managed Systems and Monitoring Profiles into executable schedules of Descriptors that the Monitoring Server can then execute. The Monitoring Server is responsible for beginning execution of schedules of Descriptors according to a planned schedule, starting and stopping essential support services including protocol stacks, and loading and unloading schedules from the current working set of processes. These two components are provided as API libraries that can then be packed into different runtime environments as required.

In one embodiment, multiple protocols are supported and new protocols can be added to the system without impacting existing protocol implementations. Protocols are implemented as ADO.NET data access drivers, allowing them to interoperate with existing NET code transparently. Leveraging the data access paradigm also facilitates the use of query languages for each protocol against a protocol schema. Each protocol driver thus has a supported connection string syntax, query language syntax, and logical relational schema mapped over the raw network management data. Examples of supported protocols are HTTP, SNMP and Perfmon, which are now described in terms of an appropriate Connection and Query.

For HTTP, a Connection is defined by a connection string that specifies the host, user, and password. For example, a connection string that attempts to authenticate JoeUser as a local account on host 10.4.68.37 may be:
hostName=10.4.68.37; User=JoeUser; pwd=MyPwd;
Authentication may require a domain portion, in which case the username includes the domain.
For example:
Example: hostName=10.4.68.37; User=JoeDomain\JoeUser; pwd=MyPwd;

For SNMP, a Connection may specify the version of SNMP protocol that a query will use in a SNMPVersion parameter. The SNMP data provider uses the GetBulk PDU if the query selects multiple columns or performs table walks and the query has specified SNMPVersion 2. An example connection is: AgentAddress=10.40.107.6; Pwd=public; SnmpVersion=2;

For Perfmon, a connection string comprises values identifying the host, User, and Password. The example attempts to authenticate a user named JoeUser as a local account on host 10.4.68.37:
Example: hostName=10.4.68.37; User=JoeUser; pwd=MyPwd;
Authentication may require a domain portion, in which case the username includes the domain Example: hostName=10.4.68.37; User=JoeDomain\JoeUser; pwd=MyPwd;

For access to the local host, Perfmon requires passing '.', not 'localhost'. Additionally, the user can specify '.' for the username and password, to instruct the Perfmon challenge connection to use existing IPC connections to servers. This approach is useful on local networks and for self-monitoring.

Perfmon queries select a particular counter value from a counter category, optionally restricted by instance name, corresponding to top-level Perfmon concepts. For example, to monitor CPU usage, the following query may be used:
select '% Processor Time' from 'Processor' where instance='Total'

The preceding query selects the processor time counter value from the processor category, limiting it to the total processor instance. For Perfmon, the schema is variable based on the number of counters and categories on the system. The counter category appears in the SQL table position. The counter instance is a selected SQL column. The instance is a SQL column that is available for WHERE clause restriction.

3.2 Data Provider/Management Channel Architecture

Figure 3:
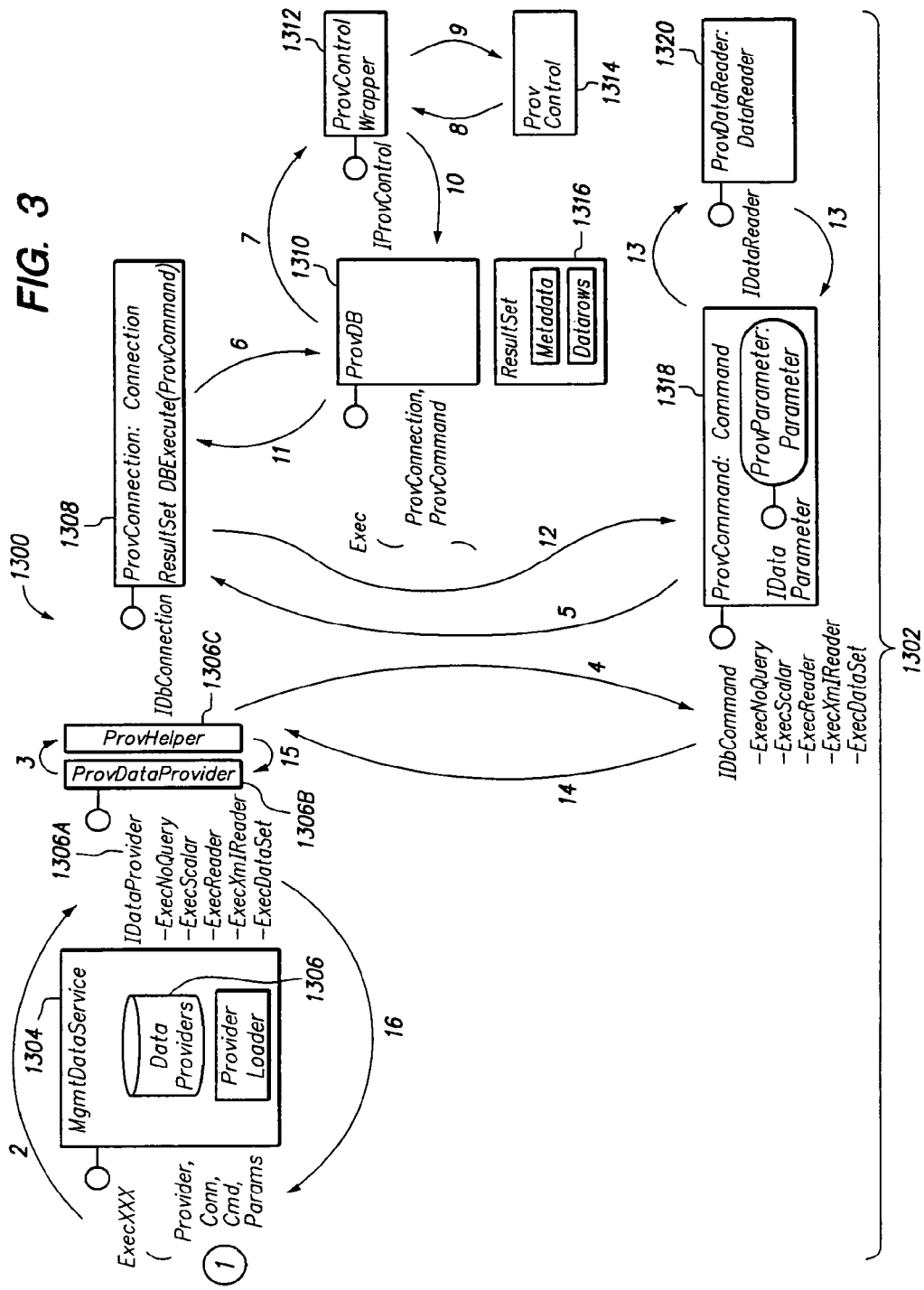
FIG. 3 is a block diagram of the data provider architecture of FIG. 2 according to an implementation.

FIG. 3 is a block diagram of the data provider architecture of FIG. 2 according to an embodiment. This illustrates an example of a data provider being used in the plurality of data providers 122.

According to one embodiment, operation of the data provider architecture 1300 of FIG. 3 proceeds according to the following steps and information flow. Initially, a management data service 1304 dynamically loads one or more data providers 1306 and forwards requests to the data providers. As seen at arrows 2 and 3, a data provider 1306 as shown in FIG. 3 represents a façade of a static helper class and implements a class IDataProvider 1306A; this arrangement enables the management data service 1304 to work with a class that it can instantiate. An instantiated ProvDataProvider object 1306B provides requests to a ProvHelper object 1306C, which is based on the MICROSOFT SQL-DataHelper object, and implements steps for opening a connection and creating a command object.

At arrow 4, the ProvHelp object 1306C invokes an IDbCommand method of Command object 1318, which invokes a DBExecute method of Connection object 1308. As seen at arrow 5, the Connection object 1308 contains a reference to a database object 1310 and passes itself and the command to it for execution. At arrow 6, database object 1310 parses the command and connection objects and translates them into query artifacts. At arrow 7, the database object 1310 passes the query artifacts to a control wrapper object 1312, which implements a provider control interface that allows a level of abstraction between the database and the control that services it. At arrow 8, the provider control interface invokes a control object 1314, which implements one or more protocol-specific data retrieval operations with respect to network elements.

At arrow 9, when the data retrieval operations are complete, the control wrapper object 1312 formats response data into a format that is accepted by the provider control interface and passes the reformatted data to the database object 1310. At arrow 10, the database object 1310 then formats the result data from the control wrapper object 1312 into a result set and provides the result set back to the connection object 1308. At arrow 11, the connection object returns the result set to the command object 1318. At arrow 12, command object 1318 formats the result set into a requested result data format, such as scalar data, reader data, XML reader data, or other data set.

At arrow 13, the command object 1318 then communicates the reformatted result data to a data reader object 1320, which provides a forward only cursor over the result set. All result formats use the data reader object 1320 for translation purposes.

At arrow 14, helper object 1306C then closes the connection. At arrow 15, the data provider object 1306B returns a result value. At arrow 16, the management data service 1304 returns a result to a calling program.

3.1.1 Log Collection Management Channel

As an example management channel, in one embodiment a log collection management channel combines multiple log readers, a multi-system log repository, and profile driven monitoring to facilitate the creation of system and host monitoring and diagnostic solutions driven from host log data. Individual host systems store log data in a variety of formats including Syslog, Windows Event Log, and plain text files. In an embodiment, a log collection management (LCM) channel collects multiple log formats into a generalized store that allows comparison and correlation of log events from multiple format sources on multiple hosts simultaneously. LCM provides a real time monitoring capability for machine-automated diagnostics coupled with a persistent log archive facility for human driven diagnostics and log reporting.

In an embodiment, a LCM Log Repository stores multi protocol, multi host logs in a specialized relational format designed to allow high speed querying without resorting to a naive log-scanning algorithm. Logs are managed and stored along multiple dimensions of analysis using a data warehouse star schema approach designed to support analytic querying of logs as well as complete human readable log reconstruction. The log data stored maintains full fidelity with the source log message while simultaneously compressing out duplicate log messages. This approach conserves disk space, allowing more logs to be stored online, and for a longer time, while simultaneously improving overall performance.

In an embodiment, the following indexing strategy is used. Each of the individual dimensions of Host, Application, and Log have effectively low cardinality compared to the overall size of a LogEntry set and should be considered for bitmap indexing. In this context, a LogEntry defines a normalized in memory representation of source host system log messages. This record is used as a communication buffer throughout the multistage pipeline of a Log Miner, as described further herein.

The Host specification may be more efficient with a b-tree. The time stamp data in the LogEntry can be divided into a virtual time hierarchy using functional indexing, decomposing the time into multiple indexes along second (time), minute(time), hour(time), day(time), month(time) in order to support cross time slicing. For example, the hour (time) index will allow queries of the form 'show me errors that occur around noon, when I think that there may be additional network congestion' without resorting to a full index scan.

Message storage may be structured as follows, in one embodiment. Each individual message, consisting of a unique log string, is stored separately from the actual LogEntry record. This approach accommodates the fact that mass-market devices typically generate the same sets of messages repeatedly. Folding of the actual message strings into separate storage referenced by an integer value key leads to substantial disk savings compared to a basic algorithm of storing all log messages directly. Messages in storage take two basic forms, a complete unique message intended to be used as is, and a message format string, intended to be used with message part substitution. For example, a sample substitution message is:

The IP address of the host is {0} and the host name is {1}.

Messages are reconstructed by selecting the appropriate message string and replacing the substitution variables with the appropriate ParsedMessagePart entry. Each braced substitution variable is a well-known value defining a particular substitution variable. For example, host name, source IP, destination IP, etc. have the same substitution variable in all proper messages. This approach standardizes message formats, provides the ability to internationalize logs after the fact of collection, and provides a basis to find log messages from different hosts and different applications that share common part values. The approach also allows questions of the form 'show me all devices that reported source IP xxx in any log record' without scanning the entire message log base.

In an embodiment, a log collection management channel accommodates expressions that provide an ability to process incoming log messages and extract important variable parts within an overall message format. Expressions use regular expressions, numbered message parts, and a priority sequence in order to extract information from the incoming message log data streams.

Expressions serve a function of normalization, in that they can extract common parts, as well as a function of compression by extracting the variable parts from largely repetitive source messages. Parsing out variable parts allows only the variable difference to be stored in the repository without information loss. The expressions serve as micro programs designed to extract ParsedMessagePart values from overall message strings.

In one embodiment, expressions use regular expression support with named group constructs to extract the message meaningful parts. An expression will always have an associated Message row with a substitution message that has the same grouping constructs referenced in the message. For example:

The log message is 'Warning: 10.1.1.1 has been scanned by 234.55.123.1'

The regular expression in the expression is: 'Warning: (?<1>[0-9]{1,3}\.[O9]{1,3}\.[0-9]{1,3}\.[0-9] {1,3}) has been scanned by (?<2>[0-9]{1,3}\.[O9]{1,3}\.[0-9]{1,3 }\.[0-9]J1,3))'

The record in the message table is: 'Warning {1} has been scanned by {2}'

MessagePart contains two rows: (1, Destination IP) and (2, Source IP)

In one embodiment, messages are recoded to the schema by multiple Log Miners. Each Log Miner is responsible for collecting or receiving a particular source log protocol, decoding the messages, parsing known message types, and finally persisting the parsed message to the schema. A Log Miner is a host program with multiple required pipeline stages. Each stage is described below in order of system execution.

A Collection stage acquires the log messages from hosts, in single messages or batches depending on the protocol, for processing by later stages. Each protocol has specific semantics that the collection stage evaluates, especially for determining whether the log message is solicited by the Log Miner or received asynchronously over the network having been transmitted by the originating host. The collection stage receives a logical stream of messages and transforms the message into individual single messages placed into the standardized internal LogEntry data structure, which is then passed to a dimensional parser.

The dimensional parser is responsible for parsing dimensional data from the source message. Dimensional data includes host, application, log, and time. The specific application content is not processed at this stage. The actual message body is separated from the rest of the message dimensional data, attached to the Message Record and handed to a Message Parser.

A message parser is responsible for analyzing the message payload for known patterns and for compressing duplicate messages. The parsing of each message is standardized into a single pipeline component shared by all Log Miners, because a protocol-specific Dimensional Parser has separated the message body from the raw message packet. The message parser performs according to the following process:

1. Look for the message, as a string in the Message table. If there is a match, record the message id in the Message Record and exit.
2. If there is no match, attempt to parse the message with the expressions, in priority order.
3. If there is a match on an expression, record the expression message id in the Message Record and append the parsed message parts to the Message Record by Message Part.
4. If there is no match on any expression, record the raw message text in the Message table. Record the message id for the newly created Message table row in the Message Record.

After message parsing, a storage stage is performed. The storage stage receives a Message Record and writes to the database, updating and maintaining all tables that may have new values including the dimension tables Host, Application, and Log. MessagePart entries may be created if an expression is matched that does not exist in the MessagePart table. Essentially, the records and dimensions are self-maintaining based on observed data from host logs.

In one embodiment, Syslog, Windows Event Log, and SNMP traps are supported. In processing Syslog log messages, a syslog collection stack receives inbound messages on a specified address that is configured on each managed host for directing syslog packets to the infrastructure servers. Individual UDP syslog packets are sent to one or more specified log host addresses that are UDP port load balancers directed to actual syslog collection server ports located on monitoring hosts. Syslog does not require polling managed hosts to process messages.

SNMP Traps in effect are a special case of syslog. Inbound traps are parsed and processed as if they were syslog.

The event stream mechanism devised by Microsoft for Windows Event Logs does not work in a distributed setting, only on the local host. Several Windows components are available for collecting event logs, but all are for collecting the entire event log from a managed system, which makes them unsuitable for a WAN setting. To overcome these shortcomings, the following algorithm is performed.

1. Ensure that an IPC$ share is connected to the managed host with a proper username and password.
2. For each managed host, connect to the event log on a timed interval to be determined.
3. Ask each host about the existence of each log on the host using the .NET API.
4. Ask the repository for the date of the newest entry in the current log that has made it to the repository disk.
5. For each log on the managed host, ask the log how many records exist using the .NET API.
6. Read the log backwards from the count until a log message is encountered that is older than the newest record collected in (3).
7. For each log record encountered, pipe the record to the Dimensional Parser.

In certain embodiments, asking for the entries collection does in fact attempt to load all records over the wire may use the base Win32 API. The backward, time-driven differential read approach of the foregoing steps provides a unique ability to collect event logs differentially over a WAN without a host-based agent.

In an embodiment, a Log Monitoring Data Provider is implemented in which logs are monitored via data provider channels that present a SQL-style interface to network management data. The provider is used within Management Attributes to extract information used to alarm or act. The LCM data provider queries the repository, not the source host systems as with other channels, and thus the log monitoring data provider differs from other monitoring channels that do direct protocol work with managed devices. This approach leverages the database and allows the LCM data provider to effectively be an extension of the generic SQL database data provider, utilizing the SQL schema presented above.

Management attributes can be defined by a combination of queries against the schema, providing the ability to perform .NET regular expression searches against the message. Such regular expression support is executed in memory, and not on the database, and uses a post-pass filter once data is extracted from the database, and sub-parsing of the query string to extract and regular expression search against the message proper.

In an embodiment, management attribute queries never scan the entire event repository, instead they limit themselves to the specific host being monitored and to events that were recorded, based on RecordedTimestamp, after the last cycle of the management attribute. This approach may use a log of last run time per host.

3.1.2 Formula Channel

In one embodiment, a formula channel provides the ability to calculate derived metrics and alarms based on data collected from one or more protocol channels. Providing formula computation as a dedicated channel allows spanning multiple protocols, as compared with a system of simple expressions within each protocol channel.

In an embodiment, a data model for the formula channel consists of the space of all samples collected by all protocol channels in the system. As each channel executes and gathers data, the results, including the sample value and time are stored within the descriptor. Collected data is available to execute formula management attributes.

The data for each running descriptor is stored within the descriptor. Additionally, a system blackboard contains all data for all running descriptors as a hash of "managedsystempath" and "attributename" to the descriptor data values. This approach provides a global data state without consuming additional memory beyond the normal executing of the running monitoring system.

In one embodiment, the following execution model is used. A descriptor running with the formula channel executes against a descriptor context that contains a set of functions for processing descriptor sample value data sets along with a reference to the invoking descriptor. This allows easy access to the managedsystempath, which is used to isolate values from the same system to compute formulas.

The base example includes computing the port utilization for a device interface. Given an interface, a formula channel attribute can gather the output counters and interface speed on the same interface.

A context provides a set of functions that are designed to process collections of values on descriptors. These are set valued functions similar to SQL aggregates. Each aggregate takes a managedsystempath and an attributename as input parameters to access the blackboard. In one embodiment, Min, Max, Current, Previous, Average, AllVAlues, and AllTimes functions are provided. Min returns the lowest sorted value of a set of descriptor samples. Max returns the highest sorted value of a set of descriptor samples. Current returns the value associated with the highest valued timestamp. Previous returns the value with the next to highest valued timestamp. Average returns the average value of all data samples. AllValues returns an array of all data sample values. AllTimes returns an array of all data sample times.

In an embodiment, the following query syntax model is used. Queries in the formula channel deviate from the standard SQL-style syntax of other channels and leverage VB.NET syntax to allow compilation of the formula to a dynamic assembly, to provide high-speed execution. The query syntax forms the interior of a single function that is passed a context object as a single parameter, which includes a reference to the invoking descriptor containing the query, a reference to the blackboard, and the context functions.

Dynamically created assemblies are created corresponding to each uniquely named attribute. The descriptor is passed as a parameter to the running instance of the formula channel contained within a descriptor. Thus, this approach allows an assembly to be recycled by multiple simultaneous monitors, as opposed to creating a dynamic assembly for each descriptor instance, which consumes excessive memory and compiler time.

Any valid VB.NET code is allowed within the dynamic function, if the code implements a function and returns a value. This approach allows substantial flexibility within a formula channel attribute including the execution of arbitrary math, invocation of the NET API, and invocation of other functionality.

In an embodiment, formula channel attributes rely on the presence of data from other channels in order to calculate under most circumstances. This approach requires attributes defined on the formula channel to run with higher scheduling intervals than basic device query polls.

3.1.3 SNMP Management Channel

Figure 6:
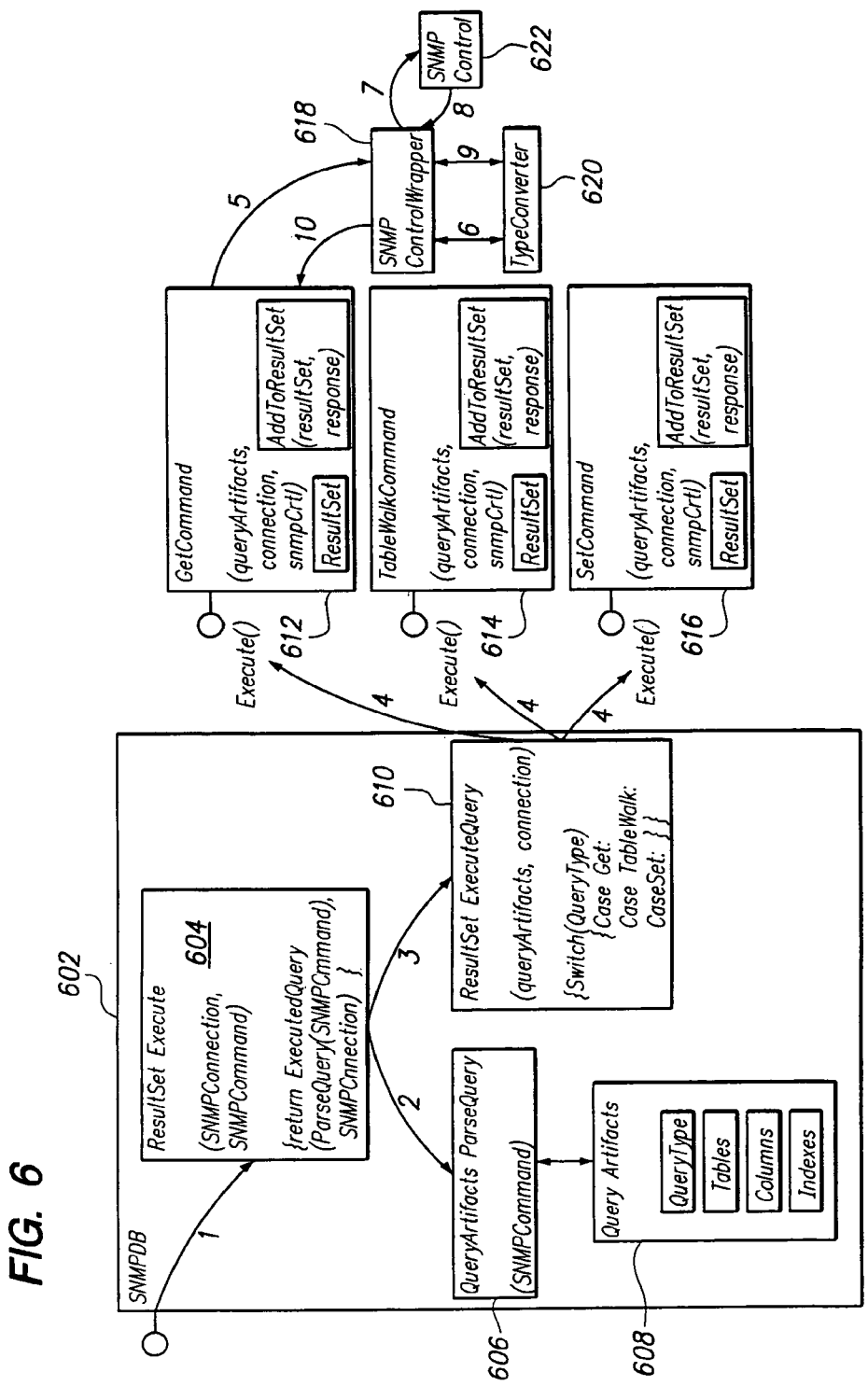
FIG. 6 is a block diagram of data structures and information flows in an example SNMP database architecture.

A more detailed view of a data provider or management channel is provided in FIG. 6. FIG. 6 is a block diagram of data structures and information flows in an example SNMP database architecture.

At arrow 1, an SNMP connection object invokes an Execute method 604 in an SNMP database object 602 and is passed a connection object and a command object. At arrow 2, the Execute method 604 invokes a Parse Query method 606, which uses regular expressions to parse the Command object into a Query Artifacts object. The Execute method 604 also invokes an Execute Query method 610, at arrow 3, which invokes a particular command based upon the query type, as seen at arrows 4.

The SNMP commands that are invoked may comprise an SNMP GET, SET, TABLEWALK, etc., which are represented by GetCommand object 612, TableWalk Command object 614, and SetCommand object 616. Each command object identifies a particular request involved in the SNMP command and translates the request into a control wrapper object 618, at arrow 5. At arrow 6, a type converter object 620 interacts with the control wrapper object 618 to convert data structures that are used internally in the system of FIG. 6 into vendor-specific data structures that will be understood by individual network devices. At arrow 7, the control wrapper object 618 then forwards one or more requests to an SNMP control object 622, which performs the requested SNMP operation on a device.

At arrow 8, when a device in a customer network provides a reply to the SNMP operations, which may comprise responsive data or and error condition, the control object 622 returns response values to the control wrapper object 618. At arrow 9, the type converter object 620 interacts with the control wrapper object 618 to convert device vendor-specific data structures to internal data structure formats as required. At arrow 10, an Add To Result Set function 613 in each of the command objects 612, 614, 616 adds the response from the control wrapper object 618 to a result set for consumption by a calling program.

3.2 Profile Plan Manager

In one embodiment, the management/monitoring system 12 provides a profile plan manager application that enables a user to create and modify profile plans using a graphical user interface. In one embodiment, executing a Profile Plan Manager application causes the user interface to display a login screen that prompts a user to provide a user identifier and password. In an embodiment, only users with a profile manager role are allowed to access the application.

A profile plan component management screen enables a user to interact with XML information and header information for all component XML documents that are used to build a profile plan. In an embodiment, profile plan components include profile selectors, profiles, CIM element filters, and schedules. The GUI provides data display and entry fields, and a series of buttons. In an embodiment, the following data entry fields are provided:

| Field name | Field type | Description |
| --- | --- | --- |
| Available components | Grid | Used to display the available profile plan components of the type indicated in the component type select list. The columns are sortable. |
| Component Type | Radio btns/Select List | Allows the user to select whether the form is being used for profile selectors, CIM element filters, schedules, or profiles. On change, the XML text area is cleared, the component grid is refreshed, and all buttons except New, Select, and Reports are disabled. |
| XML | Text Area | Used to display and edit the xml that defines the profile plan component |
| Component | Text box | Used to view/edit the name of the profile plan component name |

The following table lists the graphical buttons and their associated functions.

| Button Name | Function Description |
| --- | --- |
| New | Sets the form context to create a new profile or plan. Empties and enables the xml text area. The save, cancel, launch, and load buttons are enabled. |
| Launch xmlSpy | Launches xmlSpy. Loads a new xml document with the contents of the xml text area and the appropriate schema based on the profile/plan type |
| Load File | Opens a Windows browse pop-up and allows a user to select an xml file. The contents of the file will replace the contents of the xml text area. |
| Save | Save the plan/profile to the database. If it is a plan, also apply the plan. Upon save, the xml is validated. |

| Button Name | Function Description |
|---|---|
| Delete | Inactivates the plan/profile. Inactive profiles will not be available for users to use in building a plan (should be caught during plan validation). When a plan is invalidated, all the applied profile records are deleted. |

In an embodiment, a profile plan management screen is different from the component screens described above, as it does not rely on a user-defined XML document. A profile plan is a combination of several components and includes at least a CIM element filter and a selector. In an embodiment, a profile plan management screen includes the following:

| Field name | Field type | Description |
|---|---|---|
| Available plans | Grid | Used to display the available profile plans. The columns are sortable. |
| Plan Name | Text box | Used to view/edit the name of the profile plan |
| CIM filter | Select list | Required field - selects one of the previously defined and saved CIM element filter |
| Selector | Select List | Required field - selects one of the previously defined and saved selectors |
| Schedule | Select List | Optional field - selects one of the previously defined and saved schedules |
| UserID | Textbox | A user identifier for a user |
| Precedence | Textbox | Users can enter a number to indicate the precedence of the plan. This is used at runtime if more than one profile is satisfied by an event. |
| Profile Type | Select List | A Plan must be associated to one profile type |

When a profile plan is completed and a save operation is requested, the profile plan is validated and saved to the repository 14. In an embodiment, the plan is also applied such that the included profiles are associated with all the CIM elements defined by the CIM element filter. Plan metadata such as ProfileGroupID, ProfileGroupTimeZone, schedule, etc. also is saved with the applied profiles. In an embodiment, validation comprises verifying that the referenced schema exists, that the referenced matching profile exists, that a referenced filter exists, that a schedule exists, and that ProfileGroupID and ProfileGroupTimeZone values are provided. Filters, Schedules, Match Profiles, and Type-specific Profiles in a profile plan also may be subjected to similar validations.

In an embodiment, repository 14 comprises a profile manager database. The profile manager application controls access to the profile manager database. In an embodiment, the profile manager application includes configuration, application, online storage, and runtime functions, which are now described in turn.

In an embodiment, configuration functions include: create/edit/manage profiles; create/edit/manage selectors; create/edit/manage schedules; create/edit/manage filters; create/edit/manage plans; history tracking; and reports. Using the configuration functions, a user may create a profile plan by defining device type-specific profiles, a selector, schedules, and filters.

Application functions include: add user ID in time zone table; compile/transform profile; apply plans, including select CIM elements by filter, load active plan, load selector, and load compile profile; deactivate plans; and scheduled activation/deactivation. Application functions also include compiling a grouping profile by building a SELECT statement, creating a unique name for a profile, and generating a list of parameter names. Application functions also may include compiling a selector by updating names in a selector to match a profile name or ID, and verifying that all referenced profiles are online. Application functions also may include compiling a schedule by generating records for all intervals for which the profile is active, and compiling a select statement from XML representation.

Online storage functions include: storage for efficient lookup of active profiles for a CIM object; history tracking; scheduled activation and deactivation; and reports. Online storage in the profile manager database may include the following tables, values, and other database elements: active plans, compiled profiles, selectors, applied profile records, profile types, profile group time zone, current time zone offset, and stored procedures.

Runtime functions include: access and resolve profiles; maintain current time zone offset. In an embodiment, a profile manager runtime comprises cached and compiled profiles, and cached and compiled selectors.

Figure 10:
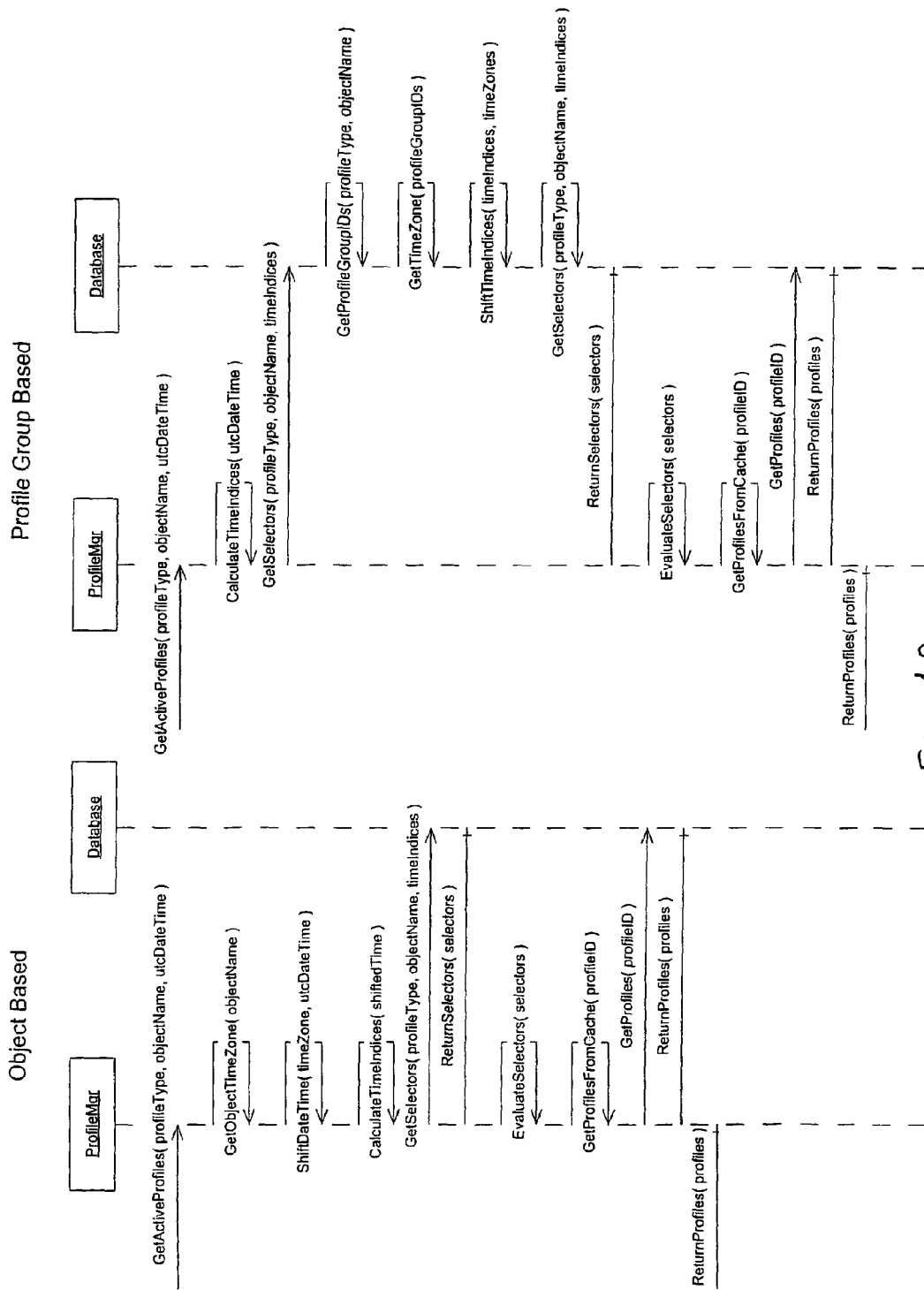
FIG. 10 is a message flow diagram showing methods of accessing a profile manager database, according to one embodiment of a profile manager application.

FIG. 10 is a message flow diagram showing methods of accessing a profile manager database, according to one embodiment of a profile manager application. Access methods may include object-based access and profile group-based access.

The following XML code listings provide examples of XML definitions of a Plan, Selector, Filter, and Grouping.

Example Plan XML Definition:

```
<?xml version= 1.0" encoding="UTF-8"?>
<Plan Precedence="1" ProfileGroupID="20"
ProfileTypeName="Grouping"
    TimeZone="CT">
    <SelectorRef Name="Selector1 "/>
    <FilterRef Name="Filter1"/>
    <ScheduleRef Name="Schedule1"/>
</Plan>
```

Example Selector XML Definition

```
<?xmi version="1.0" encoding="UTF-8"?>
<SelectorProfile>
    <Selections>
        <Selection>
            <Io:And>
                <Io:Equal Name="EventType">
                <Io:Value>SECURITY</Io:Value>
                </Io:Equal>
                <Io:And>
                    <lo:in Name="Severity">
                        <Io:Value>4</Io:Value>
                        <Io:Value>5</Io:Value>
                    </lo:In>
                    <lo:In Name="SigID">
                        <Io:Value>123</Io:Value>
                        <Io:Value>456</Io:Value>
                    </lo:In>
                </Io:And>
            </Io:And>
            <ProfileReference Name="SecurityGrouping"
            Type="Grouping"/>
        </Selection>
    </Selections>
</SelectorProfile>
```

Example Filter XML Definition

```
<?xml version="1.0" encoding="UTF-8"?>
<Filter>
```

-continued

```
        <Io:And>
            <Io:Equal Name="Site">
                <Io:Value>Amber Glen</Io:Value>
            </Io:Equal>
            <Io:In Name="CIM Class">
                <Io:Value>Server</Io:Value>
                <Io:Value>Router</Io:Value>
            </Io:In>
        </Io:And>
    </Filter>
```

Example Grouping XML Definition

```
<?xml version="1.0" encoding="UTF-8"?>
<GroupingProfileTicketableElementSpec="DEVICE">
    <Io:Or>
        <Io:And>
            <Io:Match Name="Source"/>
            <Io:In Name="SigID">
                <Io:Value>123</Io:Value>
            </Io:In>
        </Io:And>
        <Io:And>
            <Io:Match Name="Destination"/>
            <Io:In Name="Sig ID">
                <Io:Value>ABC</Io:Value>
                <Io:Value>DEF</Io:Value>
            </Io:In>
        </Io:And>
    </Io:Or>
</GroupingProfile>
```

3.3 Schedule Tweaks

Profiles and attributes provide a customizable mechanism to create monitoring and management tailored to specific product offerings. Customizing attributes en masse to provide customer, site, or device customization, while possible with attributes and profiles, represents a large data management challenge. To meet the competing needs of having standardized, per product best practice profiles with the need to create specific tailored customizations a custom modification or "tweak" mechanism is provided.

In one embodiment, tweaks are alterations to monitoring schedules that are created after applying profiles to managed CIM elements. In concept, Profiles combined with CIM Elements yield Monitoring Schedules, and Monitoring Schedules combined with Tweaks yield Customized Monitoring Schedules.

Tweaks provide ways to re-write monitoring schedules after profile application. Tweaks are stored in a tweak library, which is a set of tweak definitions that are available to users. In an embodiment, tweaks are XML files that can be created without changing the core software. Tweaks accept parameters. As an example, a tweak may be named 'Tweak Alarm Threshold' and a user could pick 90% or 75% depending on needs.

Tweaks can modify any part of a monitoring schedule. In one embodiment, tweak files can modify the following parts of a monitoring schedule: FailedToApply, Disabled, Polling Interval, Queue Size, Timeout, Connection String, Query Text, Query Parameter Values, Alarm Algorithm, Alarm Parameter Values ("Thresholds"), Action name, Action AdditionalData, and Action Timeout.

In an embodiment, multiple tweaks are allowed per customer, site, or device. Tweaks are applied cumulatively in the order in which they are applied. Tweaks can be applied in the hierarchy of the CIM, and are propagated down the CIM tree to the bottom. In this way, a tweak may be applied to a site, which would tweak all devices and all monitoring for the site, as well as to a single individual element.

In an embodiment, tweak application is persistent. The monitoring/management system 12 tracks the tweaks, which systems they are applied to, the order, and the parameters. Such information is recorded at the detail CIM element level.

Tweaks are applied in two major ways, automatically by the compiler when the tweaks for an element pre-exist, and on demand when a user picks a tweak. In an embodiment, application of tweaks on demand occurs as follows:

1. Select a tweak from the library, by name
2. Insert the parameters into the tweak as specified by the user and add that tweak to the tweak profile for the element targeted
3. Expand the CIM tree from the application target into a list of all CIM elements that contain monitoring under that target along a logical path of Customer-SiteDevice-Element
4. For the application target itself, execute the newly applied tweak against the monitoring schedule for the element
5. For children of the tweak application target that have no specific tweaks, execute the newly applied tweak against the monitoring schedule for each element
6. For children of the tweak application target that have specific tweaks, use the "monitoring reapplied" algorithm specified below for each element.

Tweak internal scripts consist of XSLT documents that can echo and transform an entire monitoring schedule changing one or more elements with a set of passed parameters. When monitoring is reapplied, the tweaks are remembered. The following tweak regeneration algorithm is used:

1. Apply the monitoring.
2. After each monitoring schedule is generated:
3. Select the tweak profile for the monitored element, recursively up the CIM Tree by getting the device, then the site, then customer. If cycle is detected or if no parent is found at any step, exit this step with whatever tweak profiles are found.
4. If a device has no tweaks locally, traversing up the parent tree will inherit tweaks for the Customer-Site-Device as appropriate
5. Tweaks are applied effectively in order from least (Customer) to most (Element) specific making the detail level tweak
6. Apply the tweaks, in order from the top of the tree (Customer-Site-Device-Element) an in order that the tweaks were applied to each element, with the previously stored parameter values.

In one embodiment, an overriding option is provided to apply a tweak without saving it to the tweak profile. The overriding option may be used to perform on-the-fly corrections of monitoring schedules for a Customer-SiteDevice-Element.

According to an embodiment, a plurality of versioning rules is provided. For monitoring schedules that have attributes that have version numbers, tweaks have a maximum version number to which they apply. This approach accommodates the case when monitoring attributes and profiles are revised ahead of the tweaks, and is a check to prevent incompatible tweaks. In one embodiment, versioning is performed as follows:

1. For each attribute in a monitoring schedule, extract the version number
2. If there is no version number present on the monitoring schedule, exit without applying version rules 3. If the version number is present, for each version number detected 4. If there is no version number on the tweak, exit without applying version rules 5. Compare the version number with the version number of the tweak 6. If the version number of the tweak is less than any version number of any attribute in the schedule, write a warning and do not apply the tweak The preceding versioning process provides an interlock to prevent unintended shredding of monitoring schedules, and ensures version compatibility. The approach is based on setting the version number of the tweaks higher than the highest attribute version number that can be affected. This approach prevents a version number from proceeding as smooth counting numbers, but still allows monotonically increasing version numbers.

In an embodiment, the following tweak removal process is used, and effectively re-applies a profile:

1. Remove a tweak from a tweak profile

2. For each CIM element 'below' the place where the tweak was removed

3. Re-apply the profiles for each element using the 'reapplied' algorithm driven by the stored profile name on each CIM element.

Interfaces comprising API support and control messages may be provided to integrate tweaks into the monitoring/management system 12. In one embodiment, a ShowAvailableTweaks control message provides a listing to users of the tweaks that are available for application. A ShowAppliedTweaks control message generates a report of the tweaks and customization applied to an element or elements. An ApplyTweak message provides, for a tweak and a set of parameter values, to apply the tweak to the monitoring for one or more CIM elements. A RemoveTweak control message removes a tweak. Removing a tweak requires re-application of monitoring followed by re-application of the remaining tweaks in order.

An embodiment may provide a graphical user interface (GUI) for selecting and applying tweaks. In one embodiment, tweaks are selected from a listing and applied to one or more targets. The selected tweaks prompt for parameter values before application. The prompt attempts to use previously stored parameter values for a tweak. For example, on tweaking alarm threshold on a customer, the second time the alarm threshold tweak is selected, the tweak parameter prompts call a ShowAppliedTweaks routine for the customer, extract the parameter values, and pre-populate the prompts with the previous values. This approach allows the user to easily see what the current tweak values are without having to break flow and select the show tweaks report. Once a tweak is selected and the parameters are filled, the tweak can be applied.

An embodiment may provide a command-line interface for selecting tweaks. Tweaks may be applied in batch for online correction. A program to tweak CIM objects matching the result of an attribute value query from the command line may be provided. For example, a command-line interface may implement the command:

tweak "search string" "tweak name" "parameter 1" "parameter 2" . . . .

Executing a command with the preceding format causes the system to apply the specified to all CIM objects that match the search string. Typical uses of such a command are to tweak all monitoring schedules for a customer or IP network.

In an embodiment, a show monitoring report integrates content from tweaks per element. The report lists the tweaks, in order, with parameter values so that the show monitoring report provides consolidated information about the state of monitoring on a device.

In one embodiment, tweaks consist of XML and XSLT documents interacting with monitoring schedules. Tweaks are stored primarily as XSLT script files with an optional version number in metadata comments. Tweak scripts may comprise any valid XSLT statement; however, tweaks should preserve the entire monitoring schedule and change only those elements that need to be tweaked. In general, tweak scripts start with an "echo" type XSLT, regenerating all elements of the source monitoring schedule and altering one or more elements that need tweaking.

Additionally, tweaks applied to elements are stored in tweak profiles. In an embodiment, a tweak profile exists for each CIM element that has a tweak, including physical elements such as devices and logical elements such as customers and sites. This profile contains the tweaks in order as well as the supplied parameters to the tweaks. This file is used for regeneration.

In an embodiment, tweak profiles are stored as XML files. The name of a monitoring scheduler file is referenced in an attribute on each CIM element that has a tweak file. This approach allows inspection of any CIM element to quickly show if it has monitoring, which is indicated by the presence of a monitoring schedule file, and if it has tweaks which is indicated by the presence of a tweak profile.

Tweak profiles are the primary memory feature of tweaks, and preserve the settings and customizations entered by users so they are not lost on subsequent applications of monitoring. Tweak profiles are stored only at the level at which they are applied. For example, a tweak applied to a site affects all devices at the site, but it is only stored in the tweak file for the site.

In an embodiment, tweaks are compiled as part of monitoring compilation. A Pre Compiler performs data selection; a Compiler performs profile application; and a Post Compiler performs tweak application.

3.4 Reporting and Graphical Analysis

An example reporting and graphical analysis system denoted a "CIO Dashboard" is now described. In one embodiment, a CIO Dashboard provides four main functions: Tickets Affecting Current Infrastructure Health; Infrastructure Health; Reliability; and Security. The CIO Dashboard provides users a centralized view of the overall health of an IT infrastructure, including WAN network elements, LAN network elements, IP telephony elements, servers, and security infrastructure elements.

In this section, the following terms have the following definitions:

"Calendar Day" means from 12:00 AM until 11:59:59 PM. "Circuit Down Activity" means an activity that indicates that an element is malfunctioning. The system supports two activities that indicate Circuit Down: Ticket Opened and Circuit Back Down. "Circuit Repaired Activity" is an activity that indicates that an element is functioning properly. Activities that indicate Circuit Repaired include Circuit Repaired and Back Up Mode. "Combined Infrastructure" refers to a logical grouping of all monitored elements for a specific customer or entity.

"Daughter Window" means a browser window that does not contain any toolbars. "Device Availability" means a method of calculating availability in which the ability of the system to resolve the issue is not considered. "Infrastructure" means a logical grouping of elements that compose a business unit. "Product Grouping" means a logical grouping of elements by service, such as WAN network elements, LAN network elements, IP telephony elements, servers, and security infrastructure elements. "Tickets with a Status of Down" means a ticket of type maintenance that does not contain a Circuit Repaired Activity or contain a Circuit Down Activity with a later timestamp than the timestamp for the last Circuit Repaired Activity.

Figure 7:
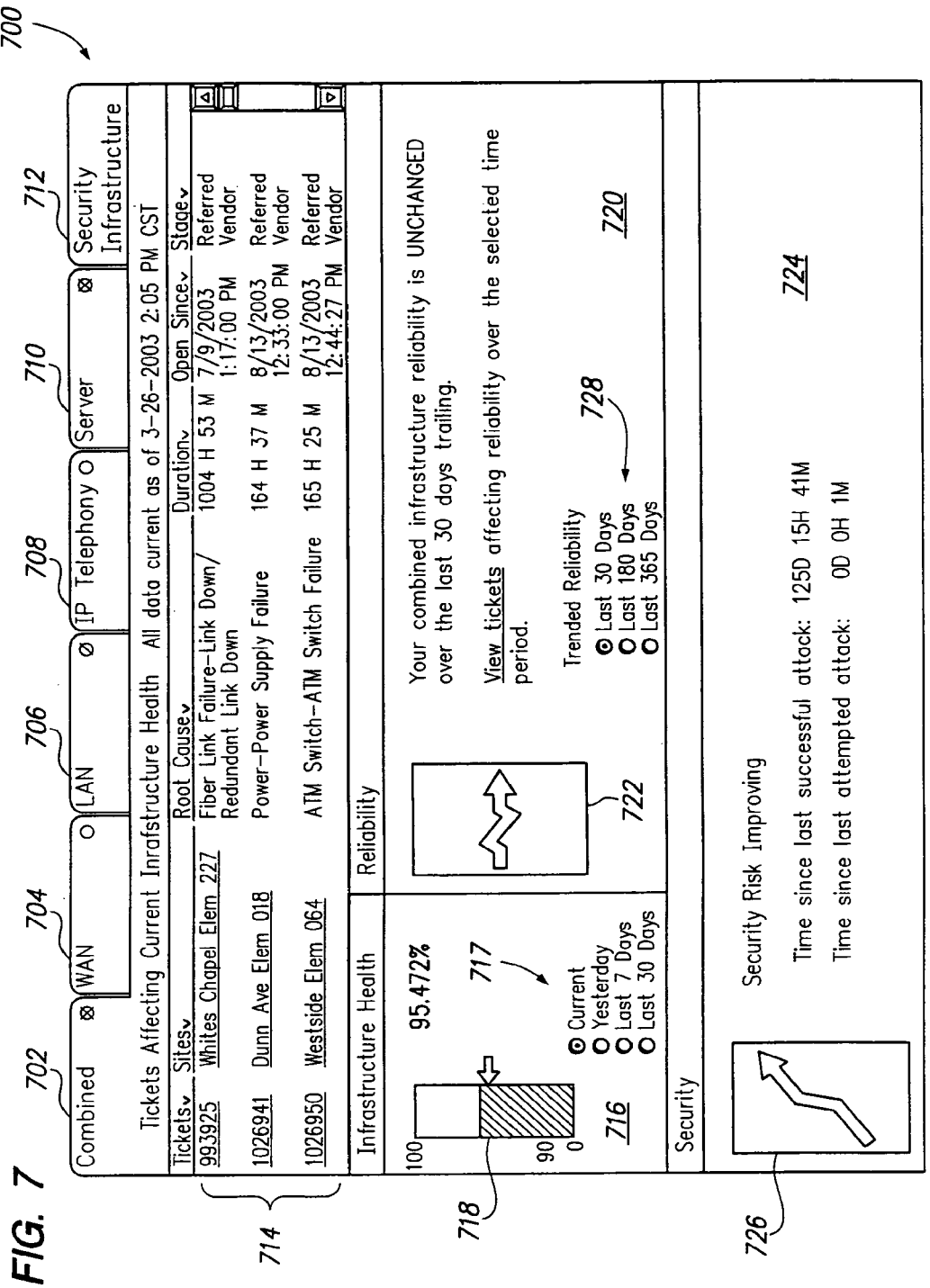
FIG. 7 is a screen display diagram of a graphical user interface display.

FIG. 7 is a screen display diagram of a graphical user interface display. The screen display 700 may be displayed using HTML graphical rendering techniques in a browser client program of a conventional PC or workstation. In one embodiment, a CIO Dashboard screen display 700 comprises a plurality of selectable tabs 702, 704, 706, 708, 710, 712 respectively associated with different product infrastructure including combined infrastructure, WAN network elements, LAN network elements, IP telephony elements, servers, and security infrastructure elements.

The label text on a tab may be grayed-out if the associated infrastructure is unavailable to the user or not present in a particular customer network. In one embodiment, each of the tabs 702, 704, 706, 708, 710, 712 comprises a status icon within the tab, such as a circle, circle with one crossing line, a circle with two crossing lines, etc. In an embodiment, if a device availability percentage value calculated by the system is >=99.000, then a green circle is displayed; if the device availability percentage is <99.000 and >=95.000, then a yellow circle with one crossing line is displayed; and if the device availability percentage is <95.000, then a red circle with two crossing lines is displayed.

Within a screen display for each tab, information is presented in four panes: a Tickets Affecting Current Infrastructure Health pane 714, Infrastructure Health pane 716, Reliability pane 720, and Security pane 724. Except for the information in the Security pane 724, in one embodiment, calculations for the metrics displayed in each pane are constrained to devices within the infrastructure associated with the currently selected tab. For example, the Infrastructure Health pane 716 of the Combined tab 702 shows infrastructure health across all a customer's monitored elements. In contrast, an infrastructure health pane that is displayed in response to selecting the WAN tab 704 shows infrastructure health across only WAN devices. For the Security pane 724, security risk for the combined infrastructure is shown in all infrastructure views or tabs.

In an embodiment, the Tickets Affecting Current Infrastructure Health pane 714 displays information for one or more problem records or "tickets" relating to one or more infrastructure elements that have a Down status. Such tickets include each ticket of type maintenance that does not contain a Circuit Repaired Activity or contain a Circuit Down Activity with a later timestamp than the timestamp for the last Circuit Repaired Activity.

In one embodiment, each ticket comprises a ticket identifier, a site label, a root cause value, a duration value, a start date, and a stage value. The ticket identifier uniquely identifies a ticket. The site label value identifies a network site at which the problem is occurring. The root cause value identifies a root cause of the problem as determined by root cause analysis system 110. A root cause value may include a major cause value and a detail cause value, or the text "unknown" if either is unknown. The duration value indicates the length in hours and minutes that the problem has existed. The start date indicates when the problem arose. The stage value indicates a stage of escalation of the problem.

In an embodiment, tickets are displayed in descending sorted order by open date, then alphabetically by sites affected. In an embodiment, a user can sort selectively by any column in pane 714, in ascending order or descending order.

In an embodiment, each ticket identifier value is hyperlinked and selectable. Selecting a ticket identifier value causes the system to display ticket detail information in a daughter browser window. Ticket detail may include a ticket description, current status for an associated site or device, a display filter, and a detailed chronology of events relating to the ticket. Ticket detail may include a site name, site address, network element product type or infrastructure type, date ticket opened, problem identifier, current status, source value, ticket type (e.g., MAINTENANCE), initials of a person reporting the problem, date closed, major cause (e.g. ENVIRONMENT), detailed cause (e.g., BUILDING POWER OUTAGE), resolution code, managed flag (yes/no), availability flag, etc.

In an embodiment, each site label is hyperlinked and selectable. Selecting a site identifier causes the system to display, in a daughter browser window, a site inventory of all network devices or other infrastructure that are located at the selected site. An example of site inventory information includes a list of WAN devices in an infrastructure, a list of LAN devices, a list of security devices, a list of server devices, etc. Each device may be identified with a device ID, vendor model number and product name, IP address, etc. A site inventory list item may include hyperlinks to a traffic analysis, reports, trending reports, and tickets related to the inventory item.

Infrastructure Health pane 716 displays a measure of infrastructure health over a specified time period, including current and historical device availability for devices associated with the selected infrastructure. In one embodiment, infrastructure health is specified as a decimal device availability value and using a device availability graphical bar 718. A plurality of radio buttons 717 enable a user to specify a time period, such as Current, Yesterday, Last 7 Days, or Last 30 Days. Selecting a radio button causes the system to recalculate the infrastructure health metric for the specified time period and update the decimal value and graphical bar.

In one embodiment, the system displays the infrastructure health percentage value in association with graphical bar 718 expressed as a percentage to the thousandth decimal position. Rounding may be used to provide numerical precision. The graphical bar 718 may comprise a stored graphical image selected from among a plurality of stored graphical images based on the calculated device availability percentage. In an embodiment, a set of twelve graphical images may be stored and selected based on the following table:

| Value | Image Displayed |
| --- | --- |
| >=100 and is >99.000 | Image for 100% |
| <=99.000 and is >98.000 | Image for 99% |
| <=98.000 and is >97.000 | Image for 98% |
| <=97.000 and is >96.000 | Image for 97% |
| <=96.000 and is >95.000 | Image for 96% |
| <=95.000 and is >94.000 | Image for 95% |
| <=94.000 and is >93.000 | Image for 94% |
| <=93.000 and is >92.000 | Image for 93% |
| <=92.000 and is >91.000 | Image for 92% |
| <=91.000 and is >90.000 | Image for 91% |
| <=90.000 and is >89.000 | Image for 90% |
| <=89.000 | Image for less than 90% |

The device availability value is calculated as follows. When the Current radio button 717 is selected, the device availability value is a current percentage of devices associated to the selected infrastructure that are functional, computed as 100−((Number of devices in the selected infrastructure associated to a ticket with a status of Down/Total number of devices in the selected inventory)*100). The Number of devices in the selected infrastructure associated to a ticket with a status of Down is the sum of devices associated to the selected infrastructure and associated to a ticket, or type maintenance, which does not contain a Circuit Repaired Activity or contain a Circuit Down Activity with a later timestamp than the timestamp for the last Circuit Repaired Activity.

Similar calculations are used for other metrics. For example, Infrastructure health for Yesterday displays the device availability for devices associated to the selected infrastructure for the last complete calendar day, e.g.: 100−((SUM of Down with Access time for devices assigned to the selected infrastructure during the last complete calendar day)/(Number of devices assigned to the selected infrastructure*selected time interval)*100.

As another example, when the Last 30 Days radio button 717 is selected, the device availability value is a device availability value for devices associated to the selected infrastructure for the last 30 complete calendar days, computed as 100−((SUM of Down with Access time for devices assigned to the selected infrastructure during the last 30 complete calendar days)/Number of devices assigned to the selected infrastructure*selected time interval)*100).

A number of tickets with a status of Down is the SUM of devices associated to the selected infrastructure and associated to a ticket, of type MAINTENANCE, which does not contain a Circuit Repaired Activity or contain a Circuit Down Activity with a later timestamp than the timestamp for the last Circuit Repaired Activity.

Reliability pane 720 comprises a graphical icon 722 representing a historical trend in device reliability of devices associated with the infrastructure of the associated tab, and radio buttons 728 for selecting a reliability trend period. For example, trend periods selectable with radio buttons 728 include the last 30 days, last 180 days, and last 365 days.

Figure 8A:
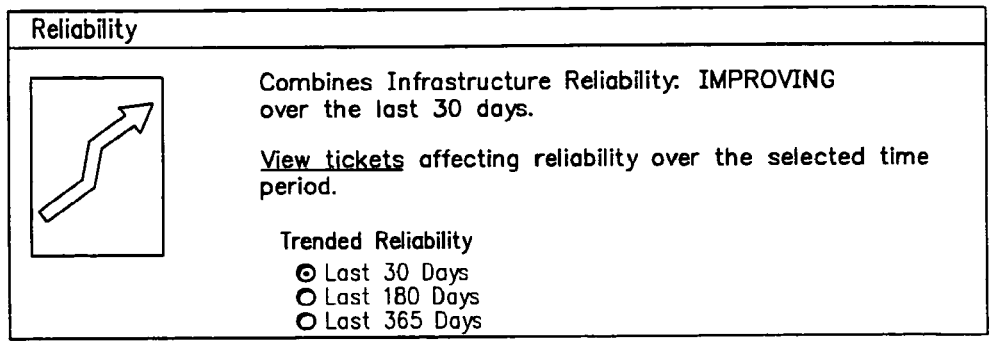
FIG. 8A, FIG. 8B, FIG. 8C are diagrams showing a graphical icon that may assume different form based on whether the trend in infrastructure reliability over the selected time period is improving, unchanged, or degrading.
Figure 8B:
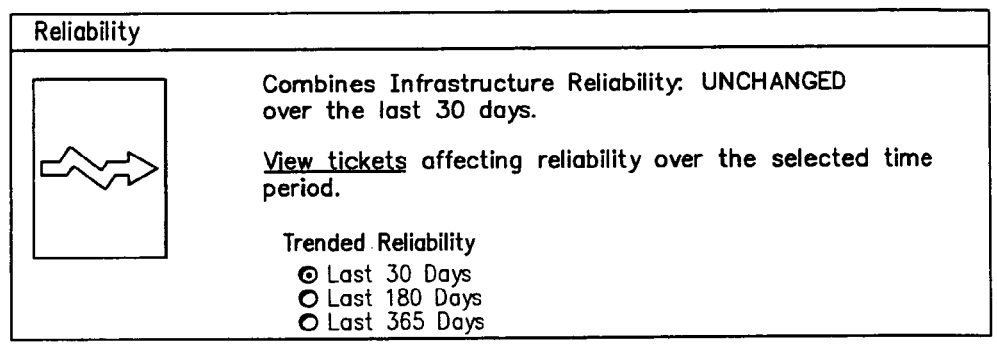
Figure 8C:
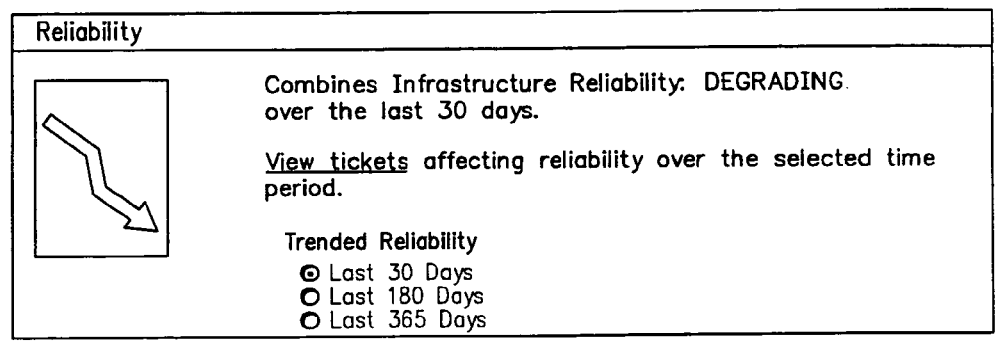

Graphical icon 722 may assume different form based on whether the trend in infrastructure reliability over the selected time period is improving, unchanged, or degrading, as respectively illustrated in FIG. 8A, FIG. 8B, FIG. 8C. The selection of a particular graphical icon 722 in the form as shown in FIG. 8A, FIG. 8B, FIG. 8C may be driven according to trended reliability value calculations. For example, when a trend is Increasing and the Reliability Average Value is >=99.000%, then a green image with an arrow pointing up is displayed; when the trend is decreasing and the reliability average value is <99.000% and >=95.000%, then a yellow image with an arrow pointing down may be displayed; when the trend is remaining constant and the reliability average value is <95.000%, then a red horizontal arrow may be displayed, etc.

In one embodiment, when the slope of a graph of a change in device reliability over a selected time period is >=00.10, then the associated trend is Increasing; when the slope is >00.10 and <−00.10, then the trend is Remaining Constant; when the slope is <=−00.10, then the trend is Decreasing. The system may display a trended reliability value that displays a historical trend of device availability for devices associated to a selected infrastructure for the past n complete calendar days. Trended device reliability may use a linear regression line calculation for the past n daily infrastructure health values, based on the number of days indicated with radio buttons 728. A reliability average value may comprise the average reliability over the past n calendar days, and the reliability average value may determine the color of a title bar and title bar text used in the reliability pane.

Reliability pane 720 may include a hyperlink to display tickets affecting reliability over the selected time period. When the hyperlink is selected, the system displays a list of all tickets that were included in determining the reliability for the selected infrastructure during the selected time frame, which are tickets that contain devices associated with the selected infrastructure. The ticket list may include the same ticket described above for pane 714.

Security pane 724 comprises a graphical icon 726 representing a level of security of the infrastructure of the associated tab. Thus, the security pane 724 enables a user to view the current security risk to the user's network, with respect to either all infrastructure types that are used in the network, or an individual infrastructure that is selected using one of the tabs 702-712.

In the example of FIG. 7, pane 724 includes text indicating "Security Risk Improving." Alternatively, pane 724 may include text indicating that the security risk of the selected tab, or the network infrastructure as a whole, is unchanged or degrading.

In an embodiment, security pane 724 may display a time period since the last attempted attack and last successful attack on the infrastructure elements associated with the selected tab. The time since the last attempted attack may comprise the time occurring since the last Attempted Attack ticket was created. Tickets with the following major causes are considered attempted attacks: Attack, Probable Attack, Successful Attack, Worm, Virus. If zero tickets of the type Attempted Attack exist, then "No Attempted Attacks Detected" may be displayed.

Figure 9A:
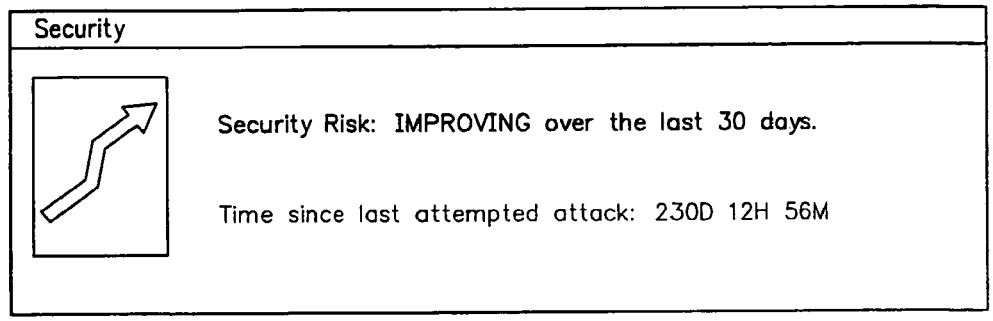
FIG. 9A, FIG. 9B, FIG. 9C are diagrams showing a graphical icon that may assume different form based on whether the trend in security over the selected time period is improving, unchanged, or degrading.
Figure 9B:
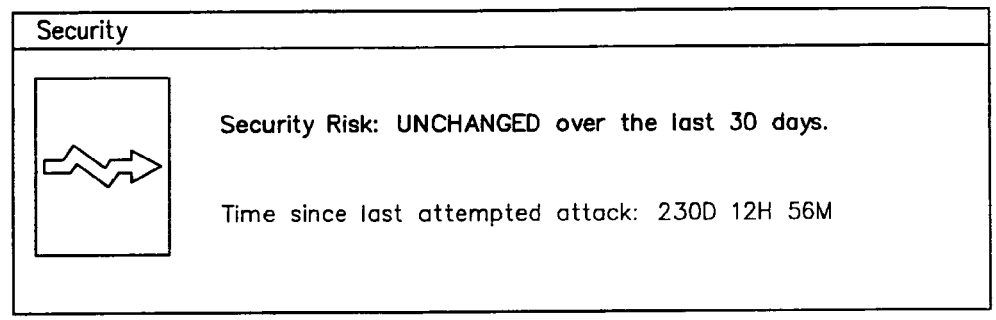
Figure 9C:
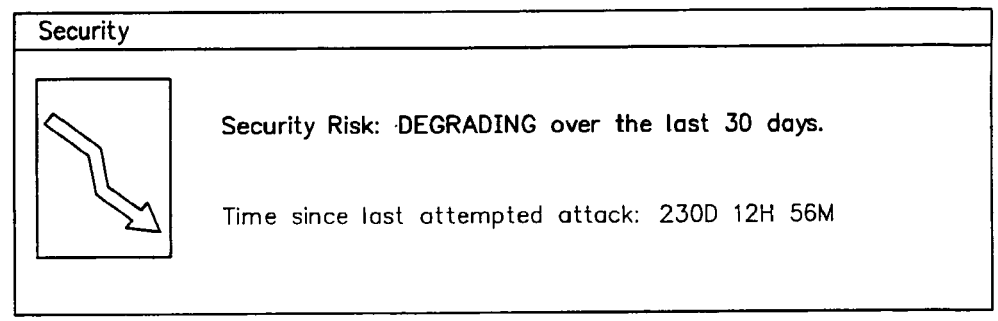

Graphical icon 726 may assume different form based on whether the trend in infrastructure security over the selected time period is improving, unchanged, or degrading, as respectively illustrated in FIG. 9A, FIG. 9B, FIG. 9C. Further, the shape and color of the graphical icon 726 may change depending on a combination of a trend in infrastructure security in combination with a value of the current average security risk. For example, the graphical icon of FIG. 9A may be displayed in green when the security trend is improving and the average security risk is then currently less than 30%, and may be displayed in yellow when the trend is improving but the current security risk is between 30% and 90%. Security risk, in this context, represents a chance that the selected network infrastructure will experience a security attack in the next time period, based on a stored history of actual last successful attacks and last attempted attacks. The selection of a particular graphical icon 726 in a shape as shown in FIG. 9A, FIG. 9B, FIG. 9C and in a particular color may be driven according to the examples given above for graphical icon 722.

In one embodiment, a security risk trend value, such as Degrading, Unchanged, or Improving, is determined by a slope of a line constructed between successive security risk values for a particular period and selected infrastructure. In an embodiment, if the slope range is >=00.10, then the trend is Degrading; if the slope range is >00.10 and <−00.10, then the trend is Unchanged; if the slope range is <=−00.10, then the trend is Improving.

A daily security risk value is calculated each day and is used by the system to determine historical trends. In an embodiment, the daily security risk value is: ((SUM of impact rating for all security tickets with Major Cause=Attack closed on the selected date+SUM of impact rating for all tickets with Major Cause=Probable Attack closed on the selected date+SUM of impact rating for all tickets with Major Cause=Successful Attack closed on the selected date+SUM of impact rating for all tickets with Major Cause=Worm closed on the selected date+SUM of impact rating for all tickets with Major Cause=Virus closed on the selected date+SUM of impact rating for all tickets with Major Cause=Recon closed on the selected date+SUM of impact rating for all tickets with Major Cause=Misuse closed on the selected date)/((Number of security tickets with Major Cause=Attack closed on the selected date+ Number of tickets with Major Cause=Probable Attack closed on the selected date+Number of tickets with Major Cause=Successful Attack closed on the selected date+Number of tickets with Major Cause=Worm closed on the selected date+Number of tickets with Major Cause=Virus closed on the selected date+Number of tickets with Major Cause=Recon closed on the selected date+Number of tickets with Major Cause=Misuse closed on the selected date)).

A trended security risk calculation for the last 30 days may comprise a linear regression line for the past 30 daily security risk values. An average security risk calculation for the last 30 days may be (SUM of Daily Security Risk Calculations for the past 30 calendar days/30).

Figure 12A:
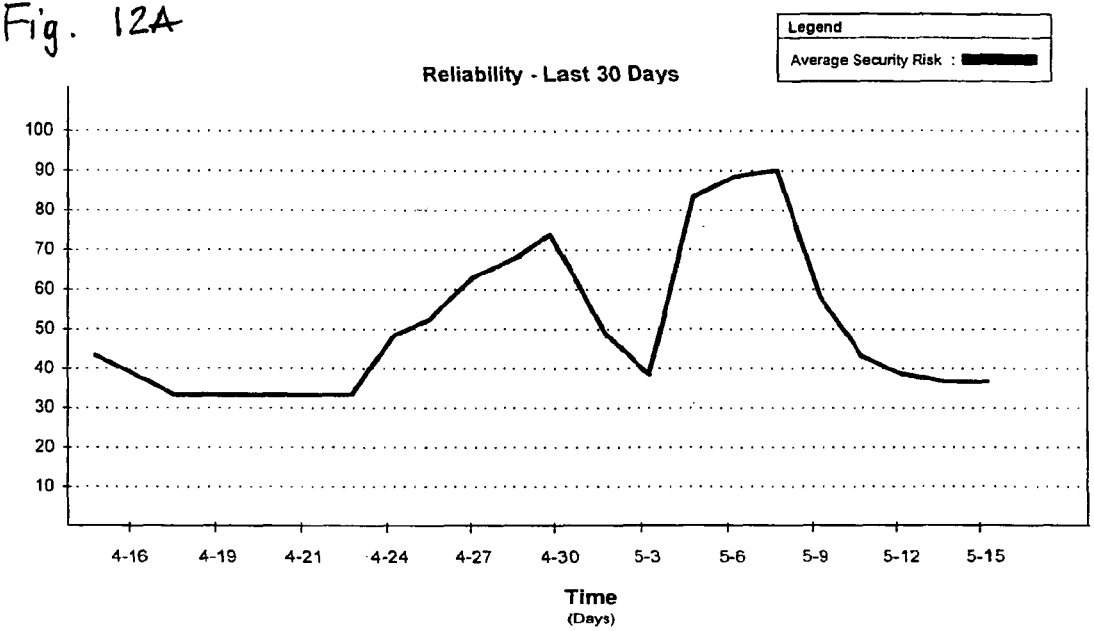
FIG. 12A is a diagram of an example reliability trending graph.
Figure 12B:
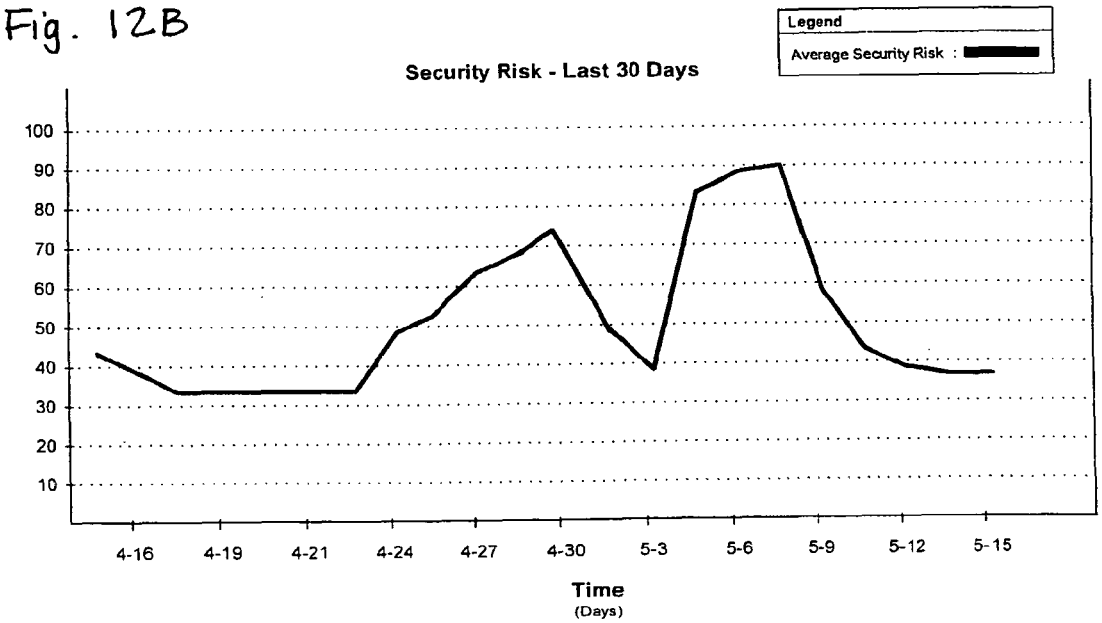
FIG. 12B is a diagram of an example security risk graph.

The reliability pane 720 and the security pane 724 may include a hyperlink, such as a security arrow, which when selected causes the system to display a security risk graph. FIG. 12A is a diagram of an example reliability trending graph that displays daily availability percentages for all monitored devices for a user-selected time period, such as the past 30 days. FIG. 12B is a diagram of an example security risk graph that displays an average daily impact rating for the last 30 days.

Screen display 700 may include a generation time section that displays the date and time of the last dashboard refresh, such as "All data current as of Mar. 26, 2003 2:05 PM CST," as seen in the example of FIG. 7.

For both the reliability pane 720 and security pane 724, current values may be computed at any suitable shorter time interval, such as every 5 minutes, and trended values may be computed once per day or any other suitable longer time interval.

4.0 Implementation Mechanisms—Hardware Overview

Figure 11:
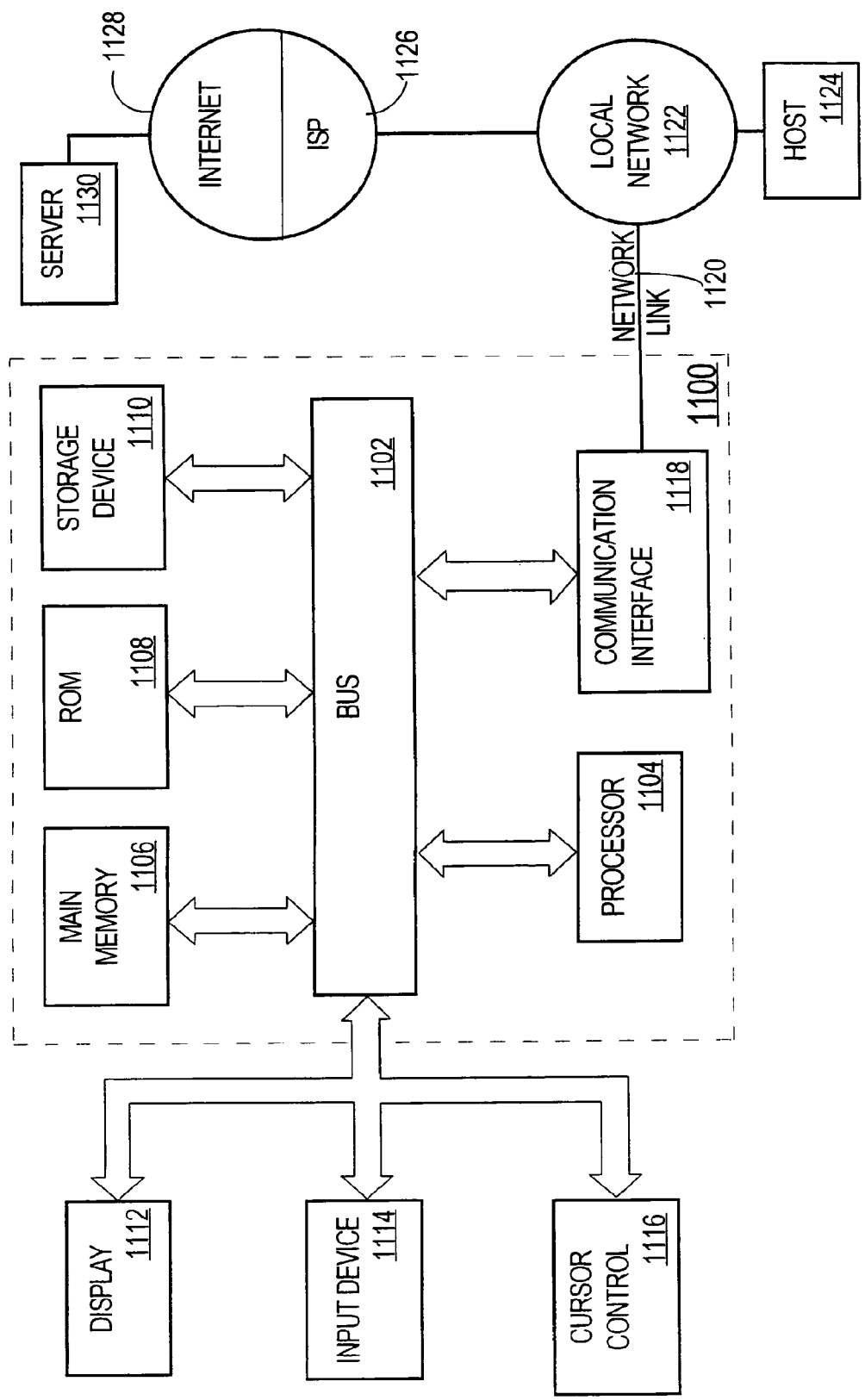
FIG. 11 is a block diagram that illustrates a computer system upon which an embodiment may be implemented.

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory ("RAM") or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory ("ROM") 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube ("CRT"), for displaying information to a computer user. An input device 1114, including alphanumeric and other keys, is coupled to bus 1102 for communicating information and command selections to processor 1104. Another type of user input device is cursor control 1116, such as a mouse, trackball, stylus, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for managing an IT infrastructure. According to one embodiment of the invention, managing an IT infrastructure is provided by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector can receive the data carried in the infrared signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network ("ISDN") card or a modem to provide a data communication connection to a corresponding type of telephone line. As another example, communication interface 1118 may be a local area network ("LAN") card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider ("ISP") 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. In accordance with the invention, one such downloaded application provides for managing an IT infrastructure as described herein.

The received code may be executed by processor 1104 as it is received, and/or stored in storage device 1110, or other non-volatile storage for later execution. In this manner, computer system 1100 may obtain application code in the form of a carrier wave.

5.0 Extensions and Alternatives

Thus, it is apparent that there has been provided, in accordance with various embodiments, an agile information technology infrastructure management system and corresponding methods and processes that provide the substantial benefit of efficient and effective remote management of disparate information technology infrastructure that provide significant value.

Although the preferred embodiment has been described in detail, it should be understood that various changes, substitutions, and alterations can be made herein without departing from the scope of the present invention, even if all of the advantages identified above are not present. For example, the various embodiments shown in the drawings herein illustrate that the present invention may be implemented and embodied in a variety of different ways that still fall within the scope of the present invention. Also, the techniques, designs, elements, and methods described and illustrated in the preferred embodiment as discrete or separate may be combined or integrated with other techniques, designs, elements, or methods without departing from the scope of the present invention. For example, various processes may be integrated at one or more servers locally, or remotely. Other examples of changes, substitutions, and alterations are readily ascertainable by one skilled in the art and could be made without departing from the spirit and scope of the present invention.

What is claimed is:

1. A computer system for use in monitoring and managing elements of a disparate information technology infrastructure, the system comprising:

a scheduler, executed using a processor of a computer system, operable to receive and process a plurality of management descriptors to generate commands associated with polling the elements of the information technology infrastructure, wherein the management descriptors include profiles that define information for monitoring the elements of the information technology infrastructure;

a plurality of data providers that include at least a first data provider that defines a first protocol for communicating management information with a first type of element, a second data provider that defines a second protocol for communicating management information with a second type of element, and a poller operable to communicate with the elements of the information technology infrastructure, wherein the plurality of data providers is operable to receive a query, to poll an element of the information technology infrastructure using one of the plurality of data providers in response to the query, and to receive a result of the query from the element;

a protocol independent command processor operable to receive a command associated with the polling of the element of the information technology infrastructure from the scheduler, to generate a query in response, to communicate the query to the plurality of data providers, to receive a result of the query from the element from the plurality of data providers, and to take an action based upon the command and the result of the query.

2. The system as recited in claim 1, further comprising a repository configured to store any of a Common Interface Model (CIM) data model of the elements of the information technology (IT) infrastructure, management descriptors, profiles and attributes of the elements, and event information.

3. The system as recited in claim 2, further comprising a root cause analysis engine configured to receive and correlate a plurality of events from a plurality of particular elements of the elements in the IT infrastructure and to determine the likely cause of an event based on availability algorithms and using the CIM data model of the IT infrastructure.

4. The system as recited in claim 1, further comprising an event processor configured to receive, log, and act upon unscheduled or unsolicited events as defined by the management descriptors.

5. The system as recited in claim 4, wherein unsolicited events comprise any of traps and syslog messages.

6. The system as recited in claim 1, further comprising a ticketing system.

7. The system as recited in claim 1, further comprising a reporting system.

8. The system as recited in claim 7, wherein the reporting system is a Chief Information Officer (CIO) Dashboard.

9. The system as recited in claim 7, wherein the reporting system is configured to generate and display, based on a plurality of events received from the elements in the information technology infrastructure, a graphical user interface display that comprises an infrastructure health value, a reliability value, and a security value.

10. The system as recited in claim 1, wherein the information technology infrastructure comprises at least two infrastructures selected from the group consisting of WAN infrastructure, LAN infrastructure, IP telephony infrastructure, server infrastructure, and security infrastructure, and wherein the system further comprises a reporting system configured to generate a combined infrastructure health value, a combined infrastructure reliability value, and a combined security risk value for all of the at least two infrastructures respectively representing combined infrastructure health, reliability, and security of all of the at least two infrastructures.

11. A method, comprising:
processing a plurality of management descriptors to generate commands associated with polling elements of an information technology infrastructure, wherein the management descriptors include profiles that define information for monitoring the elements of the information technology infrastructure;
receiving a plurality of fault events from a plurality of network elements within an information technology infrastructure, wherein the plurality of fault events are received from:
a plurality of data providers that include at least a first data provider that defines a first protocol for communicating management information with a first type of element, a second data provider that defines a second protocol for communicating management information with a second type of element, and a poller operable to communicate with the elements of the information technology infrastructure, wherein the plurality of data providers is operable to receive a query, to poll an element of the information technology infrastructure using one of the plurality of data providers in response to the query, and to receive a result of the query from the element;
a protocol independent command processor operable to receive a command associated with the polling of the element of the information technology infrastructure from a scheduler, to generate a query in response, to communicate the query to the plurality of data providers, to receive a result of the query from the element from the plurality of data providers, and to take an action based upon the command and the result of the query.

12. The method of claim 11, further comprising storing, in a repository, any of a Common Interface Model (CIM) data model of the elements of the information technology infrastructure, management descriptors, profiles and attributes of the elements, and event information.

13. The method of claim 12, further comprising correlating the plurality of fault events to determine a likely cause of an event based on availability algorithms and using a Common Interface Model (CIM) data model of the information technology infrastructure.

14. The method of claim 11, further comprising receiving, logging, and acting upon one or more unscheduled or unsolicited events as defined by the management descriptors.

15. The method of claim 14, wherein the unsolicited events comprise any of traps and syslog messages.

16. The method of claim 11, further comprising:
wherein the information technology infrastructure comprises at least two infrastructures selected from the group consisting of WAN infrastructure, LAN infrastructure, IP telephony infrastructure, server infrastructure, and security infrastructure;
generating a combined infrastructure health value, a combined infrastructure reliability value, and a combined security risk value for all of the at least two infrastructures respectively representing combined infrastructure health, reliability, and security of all of the at least two infrastructures.

17. The method of claim 11, further comprising generating and displaying, based on a plurality of events received from the elements in the information technology infrastructure, a graphical user interface display that comprises an infrastructure health value, a reliability value, and a security value.

* * * * *